US012476098B2

(12) United States Patent
Stewart et al.

(10) Patent No.: US 12,476,098 B2
(45) Date of Patent: Nov. 18, 2025

(54) ION TRANSPORT BETWEEN ION OPTICAL DEVICES AT DIFFERENT GAS PRESSURES

(71) Applicant: Thermo Fisher Scientific (Bremen) GmbH, Bremen (DE)

(72) Inventors: Hamish Stewart, Bremen (DE); Anastassios Giannakopulos, Bremen (DE); Alexander Kholomeev, Bremen (DE); Dmitry Grinfeld, Bremen (DE); Alexander Makarov, Bremen (DE); Christian Hock, Bremen (DE); Matthias Biel, Bremen (DE); Alexander Wagner, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 552 days.

(21) Appl. No.: 17/967,536

(22) Filed: Oct. 17, 2022

(65) Prior Publication Data

US 2023/0118221 A1 Apr. 20, 2023

(51) Int. Cl.
*H01J 49/06* (2006.01)

(52) U.S. Cl.
CPC .................................. *H01J 49/063* (2013.01)

(58) Field of Classification Search
USPC .......................................................... 250/281
See application file for complete search history.

(56) References Cited

U.S. PATENT DOCUMENTS 4,814,613 A 3/1989 Fite et al.
4,963,736 A 10/1990 Douglas et al.
5,708,268 A 1/1998 Franzen
6,987,264 B1 1/2006 Whitehouse et al.
7,189,967 B1 * 3/2007 Whitehouse .......... H01J 49/063 250/292
8,981,287 B2 * 3/2015 Giles ....................... H01J 49/40 250/281
9,396,919 B2 * 7/2016 Makarov ............. H01J 49/0481

(Continued)

FOREIGN PATENT DOCUMENTS

CN 101641761 A 2/2010
CN 109585257 A 4/2019

(Continued)

OTHER PUBLICATIONS

GB Patent Application No. 2114780.6, Combined Search and Examination Report issued Jul. 13, 2022.

*Primary Examiner* — Kiet T Nguyen

(57) ABSTRACT

A mass spectrometer comprises: a first ion optical device in a relatively low gas pressure region; a second ion optical device in a relatively high gas pressure region, the first and second ion optical devices receiving respective RF voltages from respective RF power supplies for generating respective RF fields that confine ions in respective trapping regions of the ion optical devices; and a gas conductance restriction, restricting gas flow from the relatively high gas pressure region to the relatively low gas pressure region, the gas conductance restriction having an aperture to allow ions to pass from the second to the first ion optical device. The first and second RF power supplies are independent to allow the RF voltages for generating the first RF field to have a different amplitude from the RF voltages for generating the second RF field.

17 Claims, 16 Drawing Sheets

(56) References Cited

U.S. PATENT DOCUMENTS

| | | | | |
|---|---|---|---|---|
| 10,804,088 | B1 | 10/2020 | Goodwin et al. | |
| 11,031,232 | B1 | 6/2021 | Stewart et al. | |
| 11,219,393 | B2 | 1/2022 | Taghioskoui | |
| 2010/0102221 | A1 | 4/2010 | Brekenfeld | |
| 2012/0091334 | A1 * | 4/2012 | Guna | H01J 49/004<br>250/283 |
| 2014/0353491 | A1 * | 12/2014 | Hager | H01J 49/063<br>250/288 |

FOREIGN PATENT DOCUMENTS

| | | | |
|---|---|---|---|
| EP | 1090412 | | 3/2014 |
| WO | WO-03102508 | A1 | 12/2003 |
| WO | WO-2020166111 | A1 | 8/2020 |

* cited by examiner

ION TRANSPORT BETWEEN ION OPTICAL DEVICES AT DIFFERENT GAS PRESSURES

TECHNICAL FIELD OF THE DISCLOSURE

The disclosure concerns a mass spectrometer comprising ion optical devices, for example multipole ion optical devices.

BACKGROUND TO THE DISCLOSURE

Extraction ion traps serve as ion accumulation and preparation devices for paired mass analysers, taking in a continuous beam from an ion source and pulsing out cooled ion packets with spatial and energy properties that are typically matched to the analyser acceptance. Such devices are commonly paired with time-of-flight (ToF) and orbital trapping mass analysers. An extraction trap well suited to ToF analysers is described in U.S. Pat. No. 9,312,114 B2. The instrumentation for an extraction trap combined with an orbital trapping mass analyser is described in U.S. Pat. No. 7,425,699 B2.

Referring first to FIG. 1*a*, there is shown a longitudinal sectional view of an existing example extraction ion trap and referring to FIG. 1*b*, there is shown a lateral sectional view of the extraction ion trap of FIG. 1*a*. This comprises: axial entrance and exit apertures 10; and orthogonal extraction apertures 15, for extraction of ions to a mass analyser 20. The RF and DC voltages applied for extraction are also shown.

Such traps are normally quadrupolar assemblies of four parallel rod electrodes, with each pair of opposing rods having opposite polarity RF waveforms applied, to provide a radial trapping pseudopotential. The rod electrodes may take the form of flat plate electrodes as shown in FIGS. 1*a* and 1*b*. The rod set is terminated by electrodes with applied DC voltages to prevent ions escaping axially. Apertures in these electrodes allow ions to be admitted from adjacent ion optical devices.

Another common structure is a 3D or Paul trap, comprised of a ring electrode with an applied RF voltage, between a pair of DC end-cap electrodes that together generate a quadrupole trapping field (R. E. March et al.; "*Quadrupole Storage Mass Spectrometry*", John Wiley & Sons, pp. 31-110, 1989).

Upon entering the trap, ions are cooled by collisions with buffer gas, usually nitrogen or helium, forming a compressed packet in the centre of the trap, which may be further compressed by increasing the repulsive DC voltages on the entrance and exit apertures. The ion packet is extracted by applying a pulsed DC ("Push", "Pull" in FIGS. 1*a* and 1*b*) to one or more of the rod electrodes to create a strong DC field orthogonal to the trap axis, with ions ejected through a slot cut into one rod. Prior to extraction, it is normal first to quench the applied RF voltages at optimal phases as described in U.S. Pat. No. 7,250,600 B2 and U.S. Pat. No. 9,312,114 B2, to optimise ion spatial and/or energy distributions and minimise interference from RF in the extraction process.

The axial trapping of ions does not necessarily need to be performed by terminal electrodes or apertures. If the RF rods themselves are segmented, then different DC voltages may be applied to each segment, forming either axial trapping wells to hold ions or DC gradients to guide them to the extraction region (described in U.S. Pat. No. 8,981,287 B2). Another alternative is to provide an axial DC via auxiliary DC trapping electrodes mounted in the space between RF rods, and elongated for only a portion of the overall rod length (GB2570435A and Stewart et al, 'A Rectilinear Pulsed-Extraction Ion Trap with Auxiliary Axial DC Trapping Electrodes', *American Society for Mass Spectrometry Conference*, San Antonio, 2018). Other methods of using auxiliary DC electrodes to generate superimposed axial gradients or trapping wells are well known, including via wedged electrodes (US20140353491 A1), segmented rods (US20140353491 A1) and chains of PCB based electrodes (U.S. Pat. No. 9,396,919 B2).

SUMMARY OF THE DISCLOSURE

In some embodiments, a mass spectrometer comprises a first ion optical device in a relatively low gas pressure region, configured to receive RF voltages from a first RF power supply for generating a first RF field that confines ions in a trapping region of the first ion optical device; a second ion optical device in a relatively high gas pressure region, configured to receive RF voltages from a second RF power supply for generating a second RF field that confines ions in a trapping region of the second ion optical device; and a gas conductance restriction, configured to restrict gas flow from the relatively high gas pressure region to the relatively low gas pressure region, the gas conductance restriction having an aperture to allow ions to pass from the second ion optical device to the first ion optical device; and wherein the first and second RF power supplies are independent to allow the RF voltages for generating the first RF field to have a different amplitude from the RF voltages for generating the second RF field.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The invention may be put into practice in a number of ways, and preferred embodiments will now be described by way of example only and with reference to the accompanying drawings, in which.

Use of the same reference numeral between different drawings is intended to show the same feature. Drawings should be considered schematic in nature unless described otherwise.

DETAILED DESCRIPTION

A major challenge faced by extraction traps is efficient capture and rapid thermalisation of injected ions from several eV energy. This favours a relatively high pressure of buffer gas, typically greater than $2\times10^{-3}$ mbar (0.2 Pa). However, efficient pulsed extraction demands minimum collision of the thermalised ions with buffer gas, especially for high mass ions. Time-of-flight, multi-reflection time-of-flight and orbital trapping mass analysers demand very low pressures, favouring a minimum of gas leaking from trap to analyser. A simple solution is to use pulsed gas valves, as described in GB2439107 B, though these operate slowly, so limit the analyser repetition rate to around 10 Hz when greater than 100 Hz might be demanded.

Figure 1A:
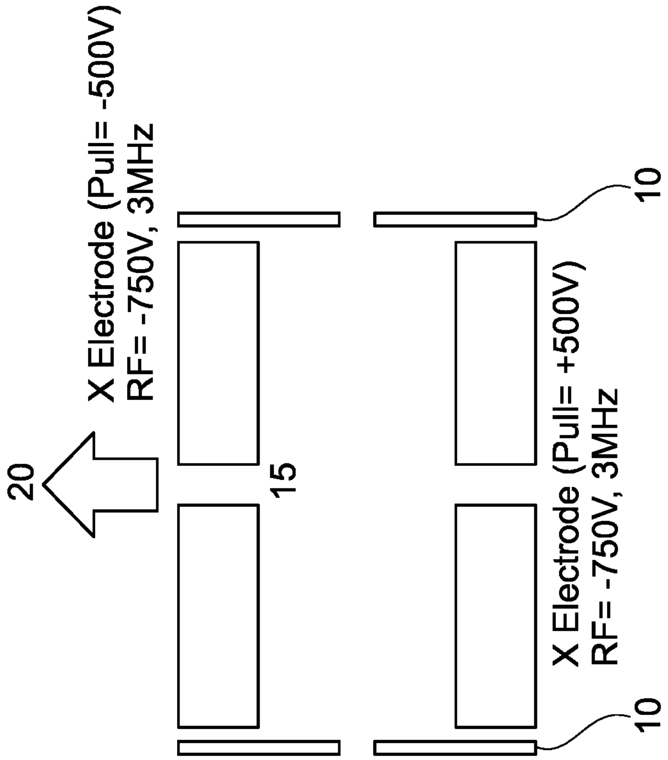
Fig. 1a PRIOR ART
FIG. 1*a* shows a longitudinal sectional view of an existing example extraction ion trap.
Figure 1B:
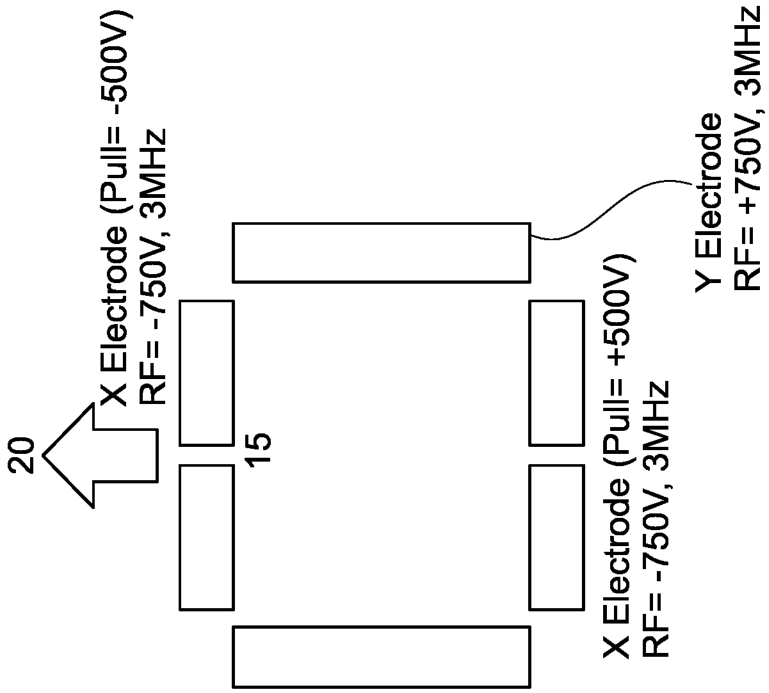
FIG. 1*b* shows a lateral sectional view of the extraction ion trap of FIG. 1*a;*
Figure 2:
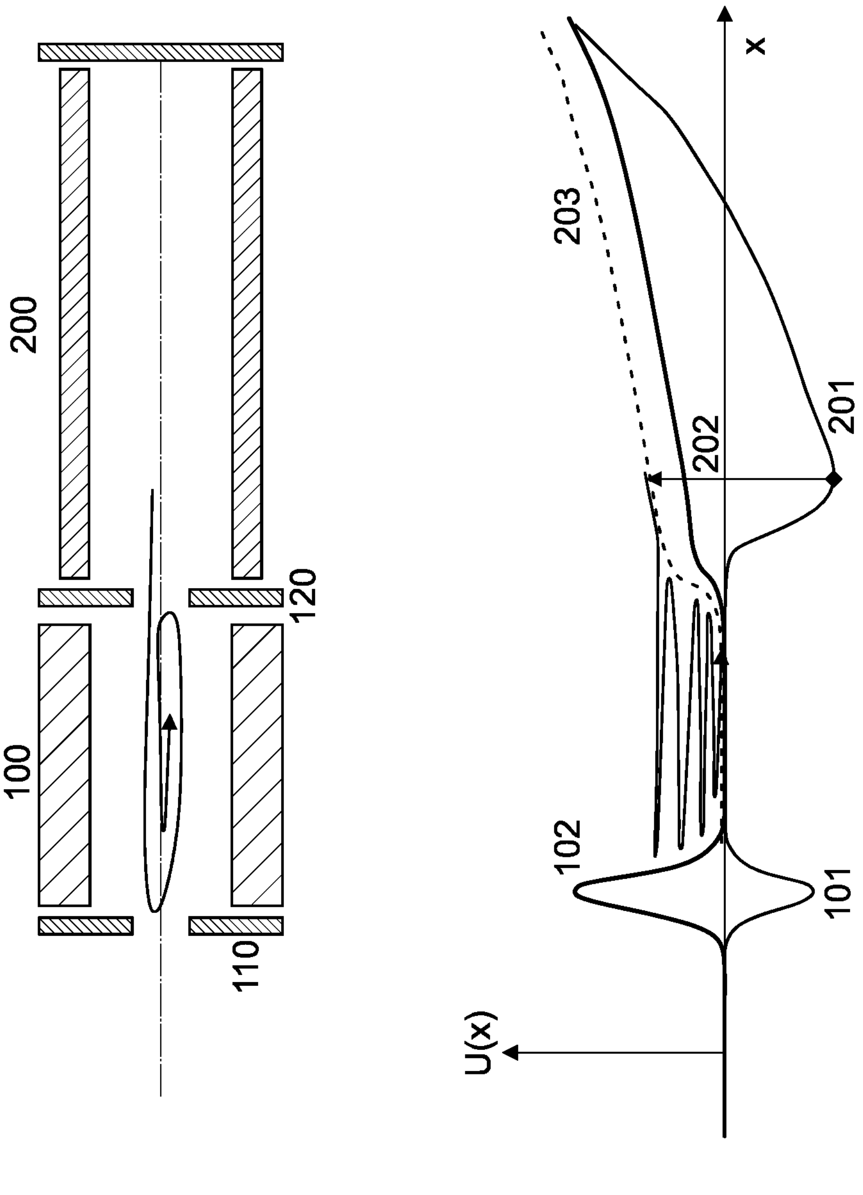
FIG. 2 schematically shows an example dual-pressure region extraction arrangement and exemplary applied DC axial potentials.

Another solution is to pre-cool ions rapidly in a high-pressure trapping region, and then transfer the ions with lower energy to a low-pressure extraction region (Stewart et al, 'A Robust C-Trap Ion Injection Method Incorporating Electrodynamic Squeezing', *American Society for Mass Spectrometry Conference,* 2020). Referring now to FIG. 2, there is schematically shown an example dual-pressure region extraction arrangement and exemplary applied DC axial potentials. The extraction arrangement comprises: a quadrupole extraction trap with curved electrodes (C-Trap) 100 conjoined to a pressurised (for example, $1\times10^{-2}$ mbar or 1 Pa) quadrupole ion guide with an auxiliary DC gradient (termed an "Ion Routing Multipole" or "IRM") 200. The C-trap 100 has an entrance lens 110 and an exit lens 120.

Ions are first passed from an ion source through the C-Trap 100 to the IRM 200, where they rapidly cool. This is achieved using an accelerating lens potential 101 applied to the entrance lens 110 and an IRM injection potential 201, to cause ion injection into the IRM 200. The ions are then cooled in the IRM 200. After a few milliseconds, the cooled ions are then purged back into the much lower pressure C-Trap 100 with trapping potential 102 applied to the entrance lens 101 and purge potentials 202. Additionally, a small dynamic DC ramp potential 203 is applied to the IRM 200 and exit lens 120 of the C-Trap 100, to prevent reflected ions coming back and striking the lens or exiting the trap before being properly cooled. An intermediate DC offset step is not shown in FIG. 2.

A limitation of this scheme is that ions must still be passed through a small aperture lens (exit lens 120 of C-Trap 100), which impedes ion transfer and requires several eV of ion energy to avoid substantial losses. The aperture is required to maintain the pressure differential between the two regions, as well as eliminating fringe field effects caused by interaction of the separate RF fields. Most desirable would be low energy transfer of ions between regions, requiring a barrier free interface that nevertheless adequately restricts gas conductance.

Figure 3:
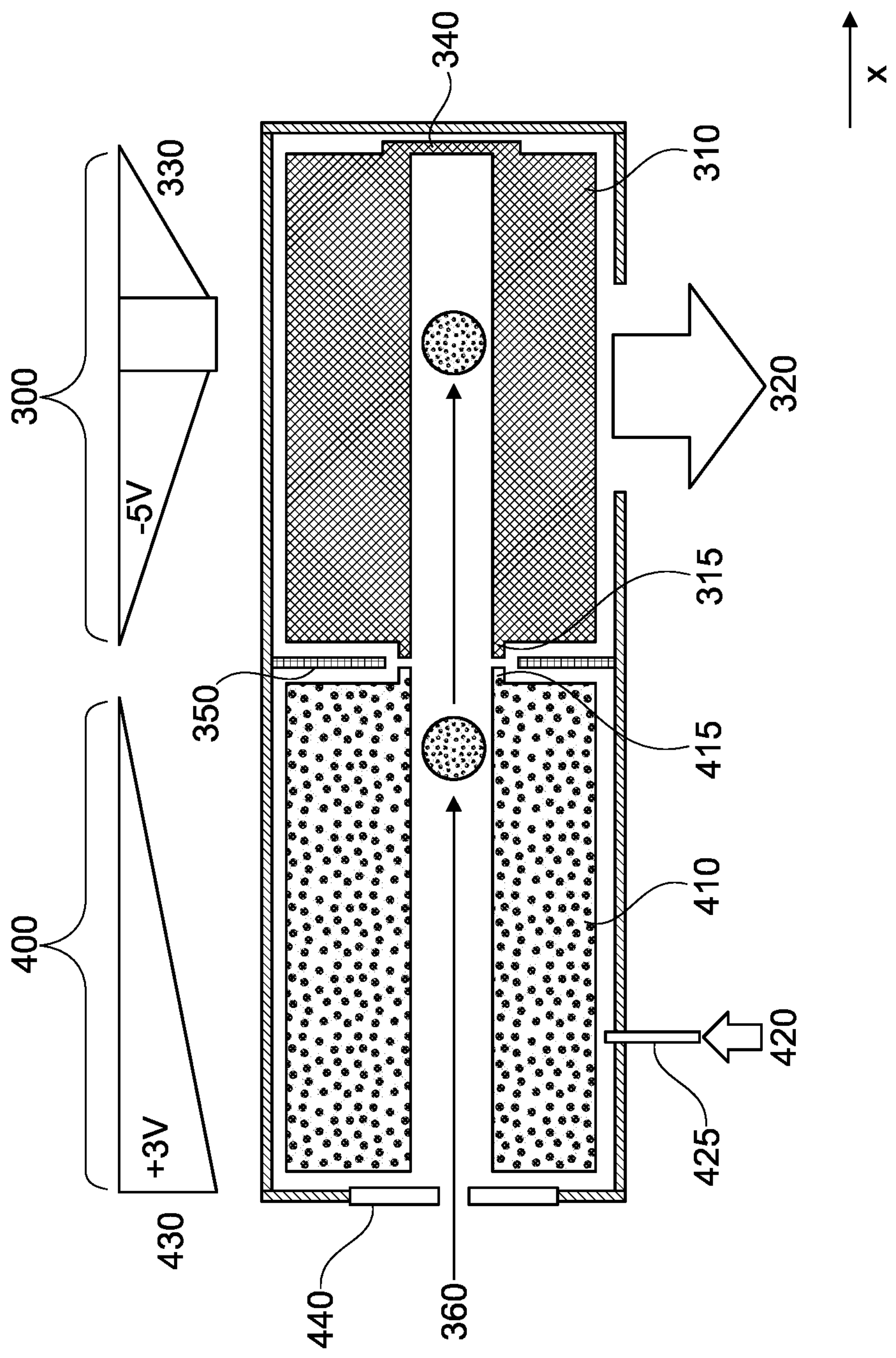
FIG. 3 illustrates an example schematic layout for an embodiment of a conjoined ion trap configuration in accordance with the disclosure.

US20190103263 A1 describes a segmented trap incorporating two pressure regions separated by a gas conductance restrictive segment. As shown in FIG. 3 of this document, the gas conductance restrictive segment is a segment with a smaller inscribed radius surrounded by a barrier. An AC (RF) voltage supply supplies voltages to cause either radial confinement or extraction. By the application of suitable DC voltages, ions can be axially confined or transferred between the two regions of different pressure. Nevertheless, practical implementations of such a trap have not been realised.

The design shown in US20190103263 A1 (comprising two multipole ion optical devices, typically quadrupoles, one in a high gas pressure region and the other in a low gas pressure region, with a gas conductance restriction between them) might provide advantageous benefits. For example, with a suitably divided AC voltage on the low radius segment to match trapping parameter, q, ions pre-cooled and pre-accumulated in the high pressure region could in principle transfer across the interface segment without substantially greater than 1 eV energy and therefore much lower pressures (no more than $5\times10^{-4}$ mbar or 0.05 Pa) would be accessible in the extraction region without heavy ion losses or excessive cooling times.

However, it has now been recognised that fringe fields where the RF fields from the high pressure and low pressure regions overlap may create a substantial barrier, requiring higher ion energy to penetrate and eliminating much of the advantage of the device. It has been established that this happens even if the trapping parameter, q, is matched, but where phase, frequency and/or amplitude are not. An additional problem presents itself when different ion populations are provided, which may differ enormously in mass-to-charge ratio (m/z), as the RF on each side may not be optimised in the case of using a single RF power supply. By providing independent RF power supplies for the ion optical (multipole) devices in the two different pressure regions, particularly allowing independent control of RF amplitude, this effect may be mitigated. This issue may apply even if one or both of the ion optical devices are not multipole ion optical devices but are configured to confine ions using RF potentials. Examples of other such ion optical devices include a stacked ring ion guide, ion tunnel device and an ion optical device comprising one or more ion carpets. For instance, the ion optical devices may include crossed ion carpets (with the downstream ion carpet or ions carpets being oriented perpendicular or orthogonal to the upstream ion carpet or ions carpets).

In particular, the fringe field may be configured such that the RF frequency and phase of the RF fields in the two different pressure regions are the same. This especially mitigates fringe fields where the RF fields overlap creating a substantial barrier.

The gas conductance restriction may comprise a diaphragm and/or may have an aperture larger than the inscribed radius ($r_0$) of the ion optical device. Additionally or alternatively, there is nothing (for example no ion optical device) between the high pressure and low pressure ion optical devices with a smaller radius than $r_0$. The RF electrodes of one or both ion optical devices (particularly multipoles) may have a lip that extends towards the electrodes of the other ion optical devices, for instance multipole (and may ingress to the gas conductance restriction). The small lips may allow the quadrupole rods to get to, or into, the aperture (for instance, of the diaphragm) and into proximity to one another to reduce fringe field effects further. A bridge between RF electrodes at an end of the low pressure ion optical device (multipole) distal the high pressure ion optical device (multipole) may provide a RF pseudopotential for axial confinement of the ions in addition to the radial confinement. Axial confinement could alternatively be achieved by means of a DC electrode at the distal end of the low pressure ion optical devices (multipole).

An advantageous mode of operation is therefore where the low pressure or extraction region operates with a separate RF supply to the high pressure region, so that one ion packet can be extracted into an analyser in parallel (for instance, by quenching the RF) with another ion population being accumulated and cooled in the high pressure region. This may allow fast parallelised processing and lower pressures to be achieved in the extraction trap.

A highly parallelised filling sequence with three trapping regions (for instance, using an upstream mass filter and/or collision cell), including a downstream low pressure region and at least one upstream high pressure region, beneficially permits fast instrument operation. One or two ion packets may be accumulated in the upstream device or devices, whilst another ion packet is being accumulated in the high pressure (multipole) region of the extraction trap and a further ion packet is being extracted from the low pressure (multipole) region of the extraction trap. Optionally, yet another ion packet may, at the same time, be analysed in a downstream mass analyser. This is quite distinct from existing approaches, which only make parallel use of two trapping stages in front (downstream) of the quadrupole. In the proposed approach, three, four or five ion packets may be processed simultaneously, with a high repetition rate (200 Hz or greater). This approach is preferably implemented together with the mass spectrometer design discussed above, or independently.

One or both of the ion optical devices (multipoles) can be formed by a stack of electrodes (separated by insulating spacers). The first (low pressure) ion optical device (multipole) may be formed by a first pair of opposing electrodes, having RF voltages of a first phase applied and DC voltages of opposite polarity and orthogonal split opposing electrodes. The split opposing electrodes have RF voltages applied of a second phase that is opposite the first phase and opposing polarity DC voltages. The second (high pressure) ion optical device (multipole) may be formed by a first pair of opposing electrodes having RF voltages of a first phase applied and a second pair of opposing electrodes (orthogonally orientated from the first pair) having RF voltages of a second phase applied that is opposite the first phase.

There is also a particular advantage in the combination of two different quadrupolar cells, one with (diagonally-mounted) auxiliary DC electrodes that favour ion trapping, transitioning into another quadrupole with split RF trapping electrodes and (equatorially mounted) auxiliary DC electrodes that are most suitable for effective ion extraction. The auxiliary DC electrodes may be tapered along the axis of the ion optical device (multipole) and/or they may be roughly equally spaced around its radius (for example, there may be four auxiliary DC electrodes for a quadrupole ion trap).

The two independent RF power supplies may share a core RF generator. The two RF power supplies may use separate coil (transformer) arrangements. A phase adjuster may be used to take RF generated by the core RF generator or one of the power supplies and use it to provide RF to the second RF power supply (in which case, a sampler may be used to sample one of the generated RF voltages).

As discussed above, it has previously been understood that efficient capture and rapid thermalisation of injected ions from several eV energy might be provided using a conjoined ion trap. This incorporates a high pressure cooling region, a low pressure extraction region, and a minimum barrier at the interface between the regions, to allow transfer of ions between the regions at reduced energy, to minimise cooling time and ion losses. In order to realise the benefits of this configuration, ions are desirably transferred into the extraction region without requiring excessive buffer gas pressure in the extraction region or excessive transfer and cooling times.

The approach of the present disclosure provides an extraction RF trap that may operate with high repetition rate via efficient parallelised accumulation and extraction of diverse injected ions. In particular, this may be achieved by barrier-free low-energy transfer across the pressure interface, to allow rapid ion thermalisation within the low-pressure extraction region.

In other words, the conjoined extraction trap incorporates a high-pressure cooling (and/or fragmentation) region and a parallelised low-pressure extraction region, separated by a conductance restriction but presenting no substantial barrier to ion transport. A distinct multipole ion optical device is provided in each region. Beneficially, RF is supplied to the multipoles on both sides of the interface via two independent RF generators. Advantageously, the outputs of the two independent RF generators are phase and frequency locked, for example by sharing a core frequency generator.

Referring now to FIG. 3, there is illustrated an example schematic layout for an embodiment of a conjoined ion trap configuration in accordance with the disclosure. This comprises a low pressure region 300 and a high pressure region 400. First trapping electrodes 310 with a first RF voltage ($RF_1$) are provided in the low pressure region 300 and second trapping electrodes 410 with a second RF voltage ($RF_2$) are provided in the high pressure region 400. A longitudinal (x) axis is also shown, for understanding the movement of ions.

In the low pressure region 300, vacuum pumping 320 is provided at a rate of about 20 L/s. In the high pressure region 400, $N_2$ buffer gas 420 is provided through a capillary 425. A diaphragm 350 is provided between the low pressure region 300 and the high pressure region 400.

In both the low pressure region 300 and the high pressure region 400, auxiliary DC electrodes are provided. The profile of the low pressure auxiliary DC electrodes 330 and the high pressure auxiliary DC electrodes 430 are shown schematically above the trap, to illustrate their shapes.

The first trapping electrodes 310 and the second trapping electrodes 410 form respective trapping RF multipole assemblies, with 100 mm length and 2 mm inscribed radius $r_0$, separated by a conductance restriction, in this case the diaphragm 350. The diaphragm 350 is a thin wall with an aperture much larger than the multipole $r_0$, so as not to interfere with the ion trapping regions. The two trapping RF multipole assemblies should have the same inscribed radius, to match the quadrupole field structure. A certain degree of tolerance to variation is possible though, but any variation will normally be insignificant. The diaphragm 350 has an additional benefit of minimising the capacitance between the multipole assemblies, making RF power supply design more feasible.

The first trapping electrodes 310 have a small lip 315 cut into them and, similarly the second trapping electrodes 410 have a small lip 415 cut into them. These lips may allow the critical edges to get as close as possible (perhaps even within the diaphragm) without breaking down to the diaphragm 350. The multipoles electrodes are ideally as close as possible to one another without causing electrical breakdown. A gap of about 0.5 mm would usually be preferred. The diaphragm 350 may extend this distance by another 0.5 mm, so the presence of the lips 315, 415 may act to reduce the distance by 0.5 mm or more.

Trapping RF is supplied to the two multipole assemblies from two power supplies (not shown), with independent control of amplitude (for dealing with two differing ion packets in parallel), but identical frequency and phase. This mitigates the formation of an RF barrier and heating process at the interface between regions. The DC offsets of each multipole assembly are preferably independently controllable. The issue of fringe fields in a segmented multipole guide is reported in U.S. Pat. No. 7,034,292B1, citing mitigations such as maximising cooling of ions before transfer.

The nitrogen buffer gas 420 is fed into the second trapping electrodes 410, or high pressure region 400 through the capillary 425, so that it reaches a pressure in the region of $5\times10^{-3}$ mbar (0.5 Pa), although anything from 1 to $20\times10^{-3}$ mbar (0.1 Pa to 2 Pa) would be normal, depending on the analyte ions. The combination of the gas conductance restriction plus around 20 L/s pumping speed in the low pressure region 300 should ensure a 5 to 10 times pressure drop at the point of ion extraction.

The auxiliary DC electrodes 330, 430 are wedge-shaped (that is, tapered along their length) and incorporated between the RF trapping electrodes 310, 410 to create a superimposed axial DC gradient along the length of the trap. These are desirable to shepherd the ions quickly across the gas-filled trapping regions and to accumulate them at the point of extraction. As an alternative, the axial DC gradient may be provided by heavy segmentation of the RF trapping electrodes 310, 410, but this is expected to be significantly more mechanically and electronically complex to achieve. Ions 360 entering the high pressure region 400 via an entrance lens 440. The polarities of the DC voltages applied to the auxiliary electrodes shown in the drawings are appropriate for the trapping and transmission of positively charged ions. It will be understood that by switching the polarities of the voltages, negatively charged ions can be trapped and transmitted in this way.

Optionally, a bridge 340 may be provided at the back, to bridge the first RF trapping electrodes 310 in the low pressure region 300. This may create an additional RF retarding pseudopotential to prevent ions escaping the trap axially. Alternatively, the same effect may be achieved by providing an additional DC electrode.

Figure 4:
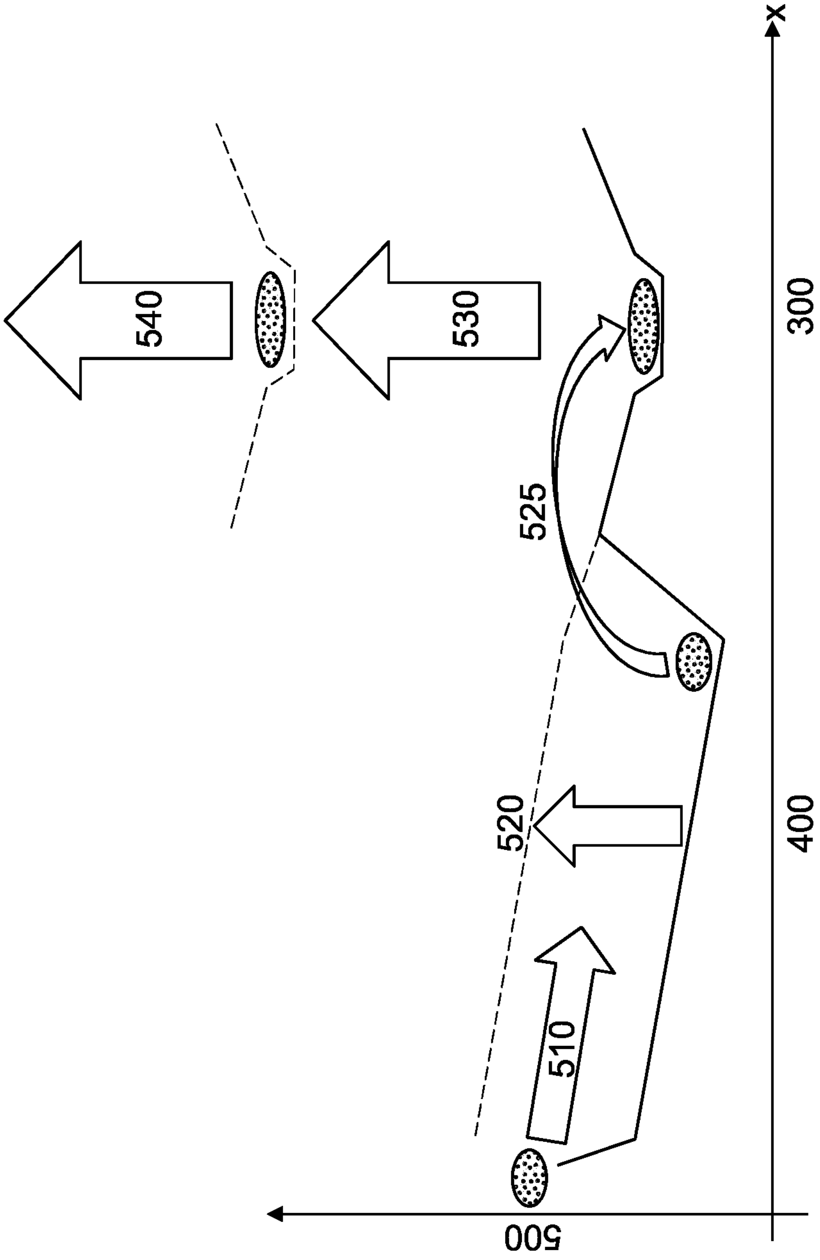
FIG. 4 depicts a plot of axial DC potential against distance along a longitudinal axis for the embodiment of FIG. 3.

Next, reference is made to FIG. 4, in which a plot of axial DC potential 500 against distance along the longitudinal axis (x) is depicted for the embodiment of FIG. 3, to explain the process of ion injection, transfer and extraction into a (Time-of-Flight or ToF) mass analyser. Where the same reference labels are used as for FIG. 3, the same features are illustrated.

In a first step 510, ions from a source are injected into the high pressure region 400 through the entrance lens, which is preferably held at a higher DC offset than the high-pressure region 400. The high-pressure region 400 should also have a lower DC offset at this point than the low-pressure extraction region 300, to prevent ions escaping. This may also be set to a level to induce fragmentation of the injected ions and/or the collision energy may be used for fragmentation. The ions are then cooled and move to the region interface at the far end of the high pressure region 400 (distal the entrance lens 440) by the superimposed DC gradient.

After a reasonable cooling period (around 1 ms), a second step 520 takes place. The potentials applied to the DC auxiliary electrodes in the high pressure region 400 are lifted slightly (+10V) to just above the potentials applied to the DC auxiliary electrodes in the low pressure region 300. As a result, the ions 525 drift into the low pressure region 300 and cool in the centre of the trap in that region, due to the axial DC field being configured to create a potential well in the centre of the trap, as shown in the drawing. The DC offset applied in the high pressure region 400 is increased to a level just above the offset applied in the low pressure region 300 (approximately 0.25 V), so that ions are injected into the low-pressure region with a minimum of energy and cool into the point of extraction (in this case, the centre of the trap).

After 0.5 ms to 20 ms cooling time, a third step 530 optionally takes place, in which the offset applied to the DC auxiliary electrodes in the low pressure region 300 is increased, for example to 4 KV. Consequently, the ions remain trapped and are ready for injection to the (ToF) mass analyser. During this period, the potentials applied to the DC and RF electrodes in the high pressure region 400 are not constrained by the field in the low pressure region 300. Therefore, new ions (a new ion packet) may be injected into the ion trap in the high pressure region 400 at this time, for instance from the ion source.

Finally, in a fourth step 540, the RF applied to the electrodes in the low pressure region 300 is quenched and an extraction DC pulse voltage is applied. This causes the ions to be ejected into the mass analyser.

It can be appreciated that segmentation of the RF trapping electrodes between the two pressure regions is not fundamentally necessary, as auxiliary DC electrodes could be used to both trap ions in the high-pressure region and shepherd them to a low-pressure region. However, this would rule out parallel processing of different ions in both regions, as the high-pressure region would see the electronic signals that eject ions from the extraction region, and thus trap operation would be substantially slowed.

In general terms, there may be considered a mass spectrometer, comprising: a first ion optical device in a relatively low gas pressure region; a second ion optical device in a relatively high gas pressure region; and a gas conductance restriction, configured to restrict gas flow from the relatively high gas pressure region to the relatively low gas pressure region. The first ion optical device is configured to receive RF voltages from a first RF power supply for generating a first RF field that confines ions in a trapping region of the first ion optical device. The second ion optical device is configured to receive RF voltages from a second RF power supply for generating a second RF field that confines ions in a trapping region of the second ion optical device. The gas conductance restriction has an aperture to allow ions to pass from the second ion optical device to the first ion optical device. Advantageously, the first and second RF power supplies are independent, particularly to allow the RF voltages for generating the first RF field to have a different amplitude from the RF voltages for generating the second RF field.

Although an aspect of the disclosure may be considered in the form of an arrangement of ion optical devices or a mass spectrometer, it may also be considered as a method of processing ions. Such a method may comprise steps of providing and/or operating the structural components of the arrangement or mass spectrometer, in accordance with their configured functionality. All of the structural features discussed herein may be equivalently considered as process steps in a method of providing or operating a mass spectrometer.

In embodiments, each of the first and second ion optical devices is a respective multipole ion optical device. The benefits of the disclosure may be applicable to ion optical devices (for example, ion guides) that use an RF field for confinement, particularly multipole ion optical devices (which may include, for example, a quadrupole, hexapole, octopole, decapole, and so on).

Beneficially, the first and second RF power supplies are configured to provide the RF voltages for generating the first RF field and the RF voltages for generating the second RF field with identical frequency and aligned phase.

Preferably, the first and second RF power supplies are configured to supply the RF voltages so as to generate the second RF field to trap ions in the second ion optical device and at the same time, to configure the RF voltages for generating the first RF field so as to eject or extract ions from the first ion optical device (the RF voltages for ejection or extraction may have zero amplitude, that is, the first RF field may be quenched).

In some implementations, the gas conductance restriction comprises a diaphragm. Additionally or alternatively, the aperture of the gas conductance restriction (which may be an aperture in the diaphragm) is larger than an inscribed radius, $r_0$, of the first ion optical device and/or the second ion optical device. Preferably, there is no ion optical device between the first and second ion optical devices that has a smaller radius than the radii of the first and second ion optical devices.

Advantageously, at least one multipole or RF electrode of one or both of the first ion optical device and the second ion optical device optionally more than one multipole or RF electrode and has a lip that extends towards the electrodes of the other ion optical device. The lip may ingress to the gas conductance restriction.

Optionally, buffer gas is fed into the relatively high pressure region through a capillary to reach a desired pressure. Additionally or alternatively, a pumping speed of the relatively low pressure region is selected to achieve the desired pressure in the relatively high pressure region. Preferably, the buffer gas and/or pumping speed may be set to achieve a 5 to 10 times pressure drop at a region of ion extraction (in the second ion optical device or multipole).

In certain implementations, multipole or RF electrodes of the first ion optical device may further comprise a bridge, such that the second RF field provides both radial and axial confinement, in particular due to the bridge causing a RF pseudopotential for axial confinement.

Further details of the present invention in general terms will be discussed again below. Other specific implementation details will first be presented.

Figure 5B:
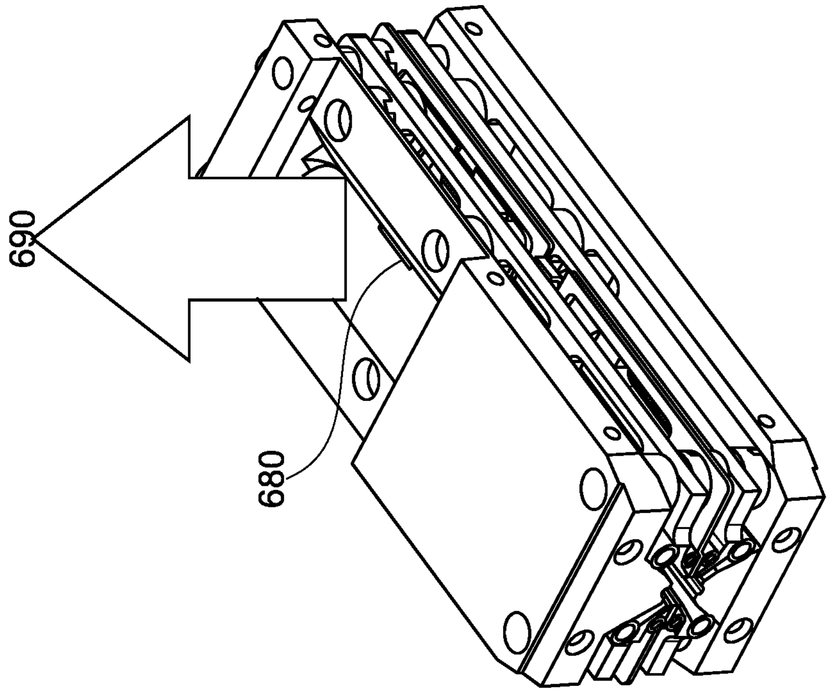
FIG. 5*b* shows a perspective view of the electrode structure of FIG. 5*a;*
Figure 5A:
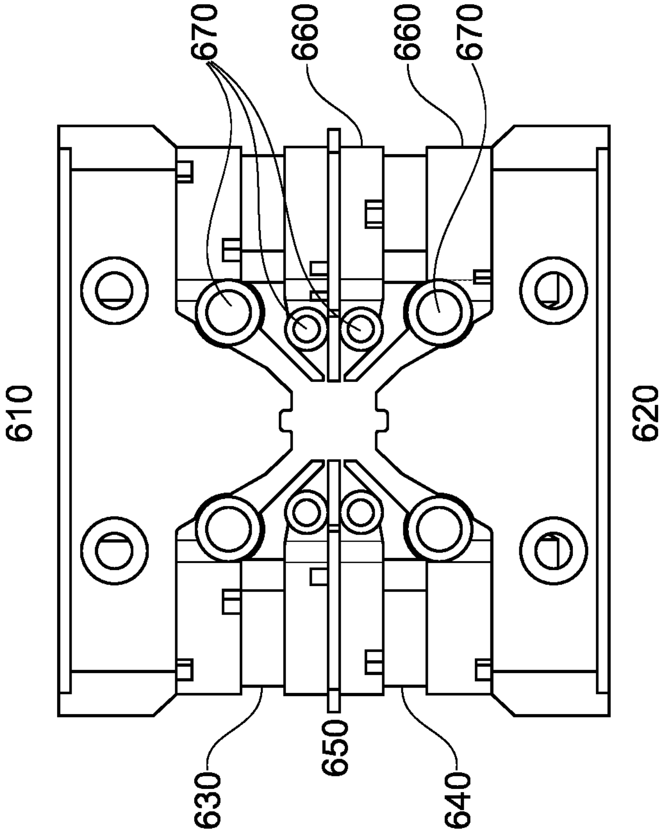
FIG. 5*a* shows an end view of an example electrode structure for the multipole ion optical device in the low pressure region.

More details about a specific embodiment of RF electrodes for the conjoined ion trap are now provided. Referring next to FIG. 5*a*, there is shown an end view of an example electrode structure for the multipole ion optical device (ion trap) in the low pressure region (the first multipole ion optical device of the general sense). Reference is also made to FIG. 5*b*, showing a perspective view of the electrode structure of FIG. 5*a*. This structure follows a similar scheme with similar applied potentials to that shown GB2570435A and Stewart et al, 'A Rectilinear Pulsed-Extraction Ion Trap with Auxiliary Axial DC Trapping Electrodes', *American Society for Mass Spectrometry Conference*, San Antonio, 2018.

The trap is formed from a stack of elongated electrodes, separated by insulating spacers. The electrode structure comprises (the RF and DC potentials applied are shown in parentheses): Pull Electrode 610 ($+RF_1$, $-DC_{PP}$); Push Electrode 620 ($+RF_1$, $+DC_{PP}$); Split Pull Electrode 630 ($-RF_1$, $-DC_{PP}$); Split Push Electrode 640 ($-RF_1$, $+DC_{PP}$); Auxiliary DC Electrodes 650; Spacers 660; Insulating Rods 670; and Ejection Slot 680.

Thus, one phase of RF is applied to the top and bottom electrodes (Pull Electrode 610 and Push Electrode 620) and 180-degree phase shifted RF is applied to the four electrodes offset from the equatorial plane (Split Pull Electrode 630 and Split Push Electrode 640), which creates the trapping pseudopotential. For a 2 mm $r_0$ trap, an applied RF of 4 MHz, with amplitude ranging from 200-2000$V_{peak\text{-}peak}$, is suitable for common analyte ions.

The auxiliary DC electrodes 650 (which are wedge-shaped, as shown in FIG. 3) are along the equatorial plane, to which a small voltage is applied to create a weak axial potential gradient, for example a potential well at the point of extraction from the trap. Optionally, insulating rods 670 may be inserted between the electrodes that extend from the entrance to approximately half the length of the trap, to further improve the conductance restriction between regions.

When ions are trapped and sufficiently cooled at the ejection (or extraction) slot 680, the whole extraction region may optionally be lifted in potential, then the RF potentials are quenched, preferably pull electrode 610 and push electrode 620 first and then split push/pull electrodes 630, 640 after a half cycle (as discussed in the similar schemes mentioned above). Negative extraction, or push/pull pp, DC (relative to ion polarity) is applied to the Pull Electrode 610 and Split Pull electrode 630, whilst positive DC is applied to the Push Electrode 620 and Split Push electrodes 640, ejecting ions through the extraction slot 680. This relatively complex application of voltages creates a strong and even field at the centre of the trap, though simpler methods also function such as only applying extraction DC only to Pull Electrode 610 or Push Electrode 620, or both. An extraction field of 250-500 V/mm is thought suitable for ejection to time-of-flight analysers. As the auxiliary DC electrodes 650 sit at the zero-potential line of the extraction DC gradient, they do not need any additional potential applied at the point of extraction.

The split RF electrodes may have two independent advantages. First, their use may strengthen the pulsed extraction field in the centre of the trap and second, they may create space to introduce the auxiliary DC electrodes 650. Otherwise, non-equatorial auxiliary DC electrodes (that is, coming in from the four corners) may be provided, but then they would have to have the extraction DC applied to them, which may be very electronically complicated.

Figure 6B:
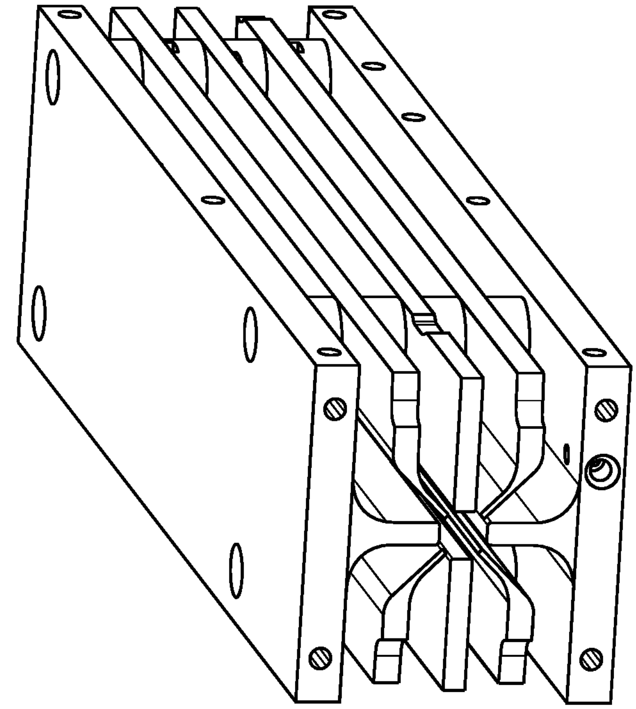
FIG. 6*b* shows a perspective view of the electrode structure of FIG. 6*a;*
Figure 6A:
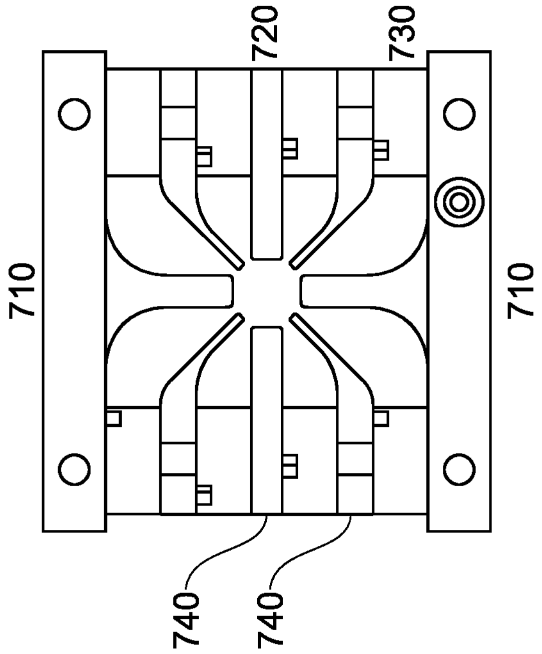
FIG. 6*a* shows an end view of an example electrode structure for the multipole ion optical device in the high pressure region.

Referring now to FIG. 6*a*, there is shown an end view of an example electrode structure for the multipole ion optical device (ion trap) in the high pressure region (the second multipole ion optical device of the general sense). Reference is also made to FIG. 6*b*, showing a perspective view of the electrode structure of FIG. 6*a*. The entrance aperture (lens) is not shown in this drawing.

The electrode structure comprises: outer trapping electrodes (to which a RF potential $+RF_2$ is applied) 710; inner trapping electrodes 720 (to which a RF potential $-RF_2$ is applied); spacers 730; and Auxiliary DC electrodes 740. This electrode stack is simpler than the corresponding stack for the extraction region, as there are only four trapping electrodes with alternating in-phase and 180-degree out-of-phase RF applied from a frequency-locked second RF supply.

There are in this case four auxiliary DC electrodes 740, mounted to protrude into the corners of the trapping region circumference (interleaved between the RF electrodes 710, 720), and wedged so that the protrusion decreases down the length of the region. The opposite trend is also possible, but may make it slightly more difficult to determine the absolute DC potential at the interface, as it becomes the sum of rod potential plus perturbation from the auxiliary DC electrodes 740. The use of four auxiliary DC electrodes 740 is preferred for this region, because the radial trapping pseudopotential is far less perturbed by the superimposed octupolar DC field than the quadrupolar perturbation inflicted by the equatorial DC electrodes 650 in the extraction region.

The switch between a quadrupole layout of the multipole ion optical device in the high pressure region with auxiliary electrodes suited to trapping or transmission, to a layout suited to extraction in the low pressure region is highly advantageous. It can readily be seen how such electrode layouts may be enclosed by insulating covers to control gas flow.

Returning to the general sense of the disclosure discussed above, further optional and/or preferable details can be considered. For example, the first and/or second (multipole) ion optical device may be formed by a stack of elongated electrodes, separated by insulating spacers. Advantageously, the first ion optical device may be configured to receive ions from the second ion optical device along a common axis of the first and second ion optical devices and to allow extraction of the received ions in a direction orthogonal to the axis.

Advantageously, the first ion optical device and/or the second ion optical device comprise auxiliary DC electrodes arranged to receive a DC potential so as to create an axial DC gradient superimposed on the respective RF field. The auxiliary DC electrodes may be tapered along an axis of the respective ion optical device. In some implementations, the auxiliary DC electrodes are approximately equally spaced around a radius of the respective (multipole) ion optical device. The first (multipole) ion optical device may comprise an electrode stack with the auxiliary DC electrodes in the centre of the electrode stack. Additionally or alternatively, the second (multipole) ion optical device may comprise equally spaced RF electrodes for generating the RF field and the auxiliary DC electrodes may be interleaved between the RF electrodes.

In an implementation, wherein the first ion optical device is a first multipole ion optical device, the first multipole ion optical device comprises: a first pair of opposing electrodes, having applied the same RF voltages of an RF magnitude and a first phase and opposing polarity DC voltages of a DC voltage level; and a second pair of opposing electrode arrangements. Each of the opposing electrode arrangements comprises: a split RF electrode comprising two separated electrode parts that have applied the same RF voltages of the RF magnitude and a second phase that is opposite the first phase and opposing polarity DC voltages of the DC voltage level. An auxiliary DC electrode may then be provided between the two separated electrode parts of the split RF electrode. Optionally, the first multipole ion optical device further comprises a bridge between the first pair of opposing electrodes of the first multipole ion optical device, such that the first RF field provides both radial and axial confinement. Additionally or alternatively, the second ion optical device is a second multipole ion optical device and the second multipole ion optical device comprises: a first pair of opposing electrodes, having applied the same RF voltages of an RF magnitude and a first phase; and a second pair of opposing electrodes, having applied RF voltages of the RF magnitude and a second phase that is opposite the first phase. Auxiliary DC electrodes may be provided between each of the first pair of opposing electrodes and respective ones of the second pair of opposing electrodes.

The first and/or second multipole ion optical device may comprise insulating rods between multipole electrodes of the ion optical device. Then, the insulating rods may extend from an entrance of the ion optical device to approximately half the length of the ion optical device.

Additional specific details of the disclosure will now be discussed. Further description according to the general senses will be detailed subsequently.

Possible embodiments of RF power supplies for the (multipole) ion optical devices in the high and low pressure regions are now considered. It is highly desirable that the RF power supplies for both pressure regions share the same frequency, as this may mitigate generation of strong fringe field effects at the region interface. Nevertheless, the RF power supplies are beneficially configured as separate supplies, for example so that the RF field applied in the high-pressure region survives the quench of RF field in the low-pressure region quench and high voltage offset for extraction.

Even a small frequency error may lead to completely different fields in each region over a short time, so the two supplies are advantageously frequency locked. One way to accomplish this is to drive the primary coils of each supply from the same frequency generator, possibly also incorporating means to generate a phase shift on one supply to allow alignment of output RF phases.

Figure 7:
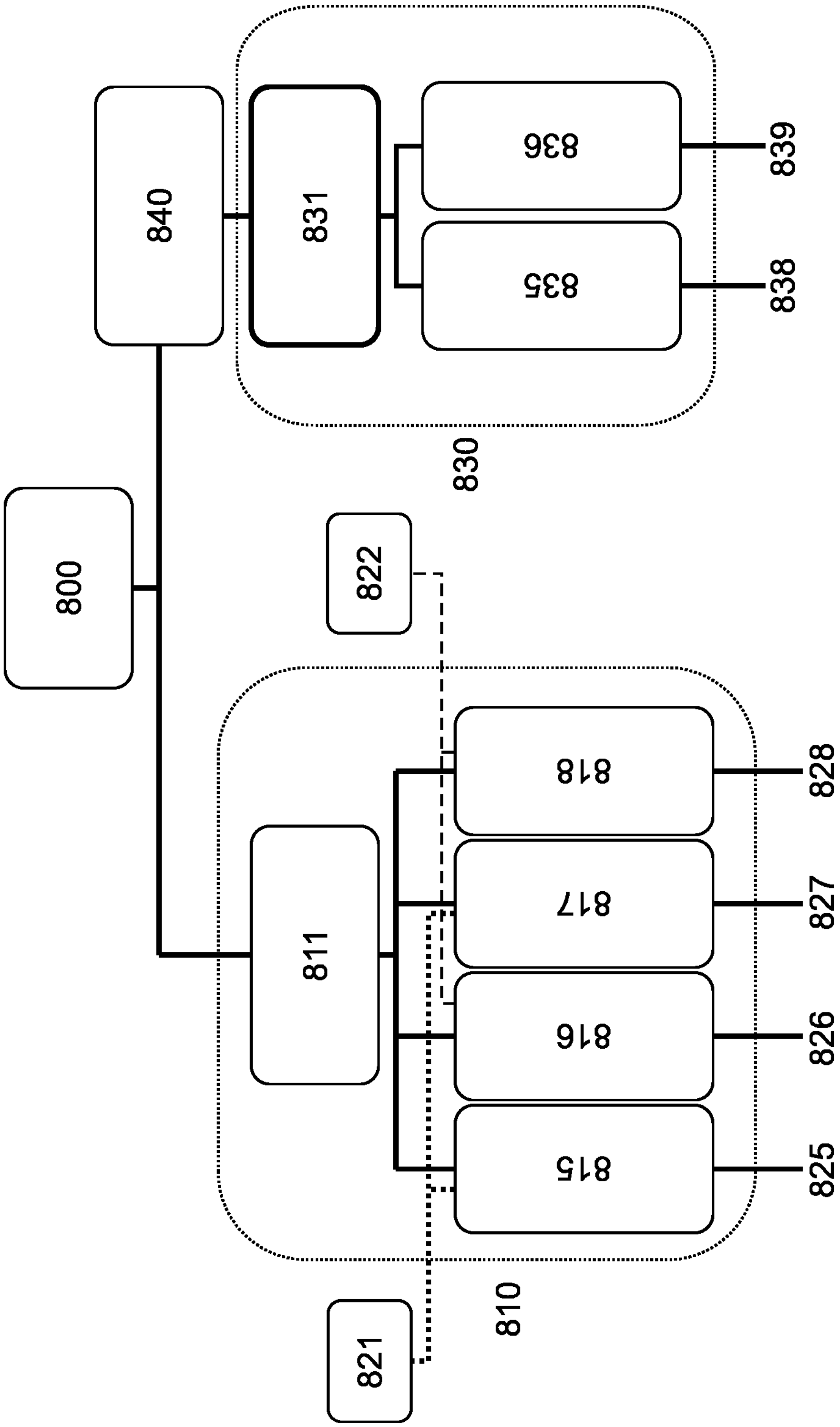
FIG. 7 schematically illustrates a block diagram of a first possible power supply arrangement.

Referring next to FIG. 7, there is schematically illustrated a block diagram of a first possible power supply arrangement. This comprises: frequency generator 800; $RF_1$ coil arrangement 810, comprising a primary winding 811 and secondary windings 815, 816, 817, 818; a $V_{Push}$ DC supply 821; a $V_{Pull}$ DC supply 822; $RF_2$ coil arrangement 830, comprising a primary winding 831 and secondary windings 835, 836; and a phase adjustment block 840. Thus, the incorporation of secondary coils in each supply drive each output RF phase, as well as the addition of push and pull extraction DC potentials. This provides push electrode potential 825; pull electrode potential 826; split push electrode potential 827; split pull electrode potential 828; +RF for the High Pressure Region 838; and −RF for the High Pressure Region 839. This is similar to the approach taken in U.S. Pat. No. 6,340,814B1, where RF power supplies to adjoining segments are frequency locked by sharing a common frequency generator or clock.

The disadvantage of such a system is that the two regions may not be independently frequency tuned. Normally, frequency would be fine-tuned for each power supply to a resonance. Another disadvantage found with such a power supply scheme is that phase may shift with amplitude, so an alternative arrangement is also considered.

Figure 8:
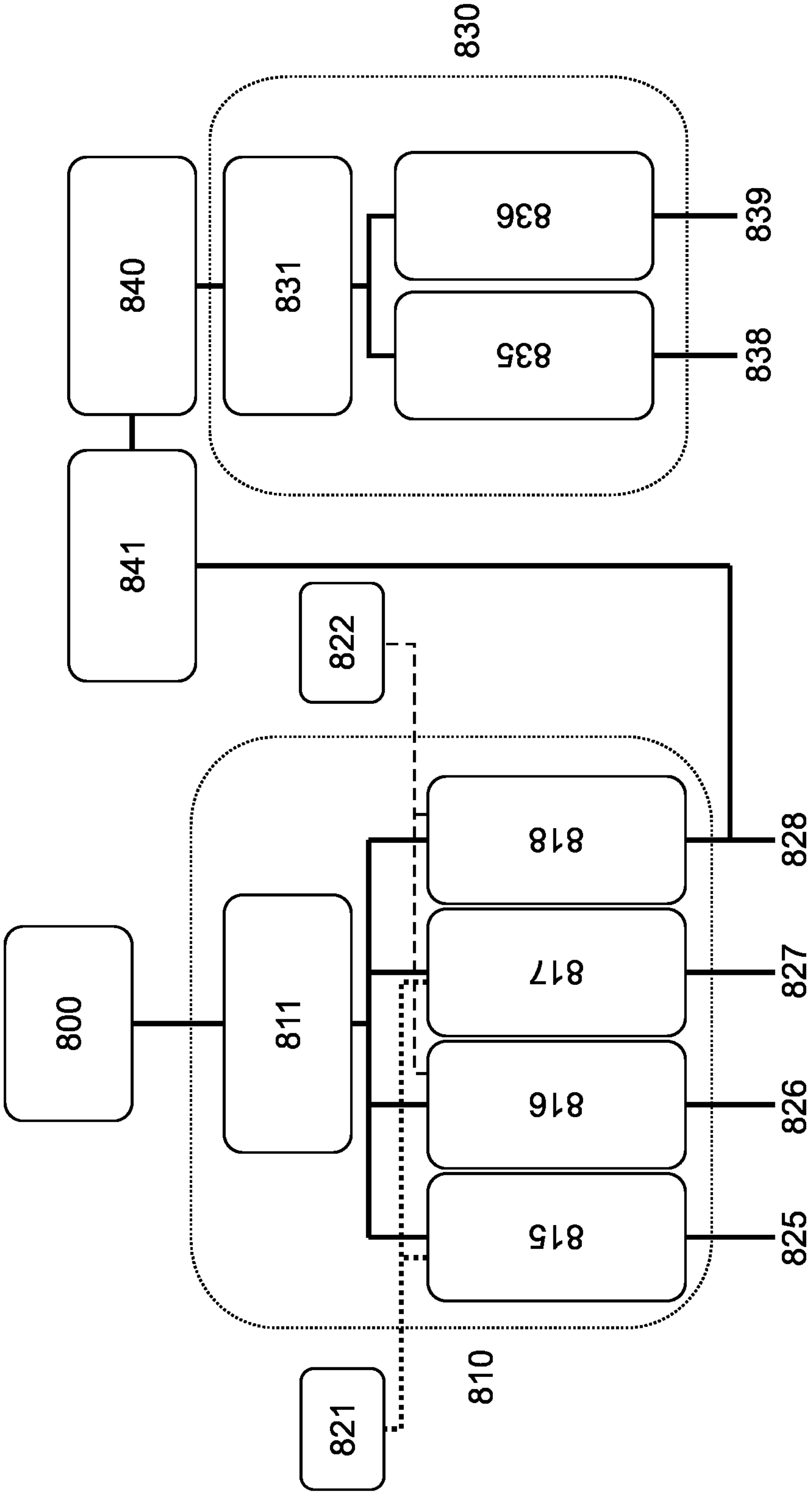
FIG. 8 schematically illustrates a block diagram of a second possible power supply arrangement.

Referring next to FIG. 8, there is schematically illustrated a block diagram of a second possible power supply arrangement. Where the same blocks are illustrated as those of FIG. 7, the same reference numerals are used. This provides frequency and/or phase locking, by using the output of one phase of the first RF supply (for example the split pull electrode potential 828), sampling this output using measurement block 841 and then using it to drive the second power supply (through the phase adjustment block 840), protecting the second power supply from phase shifts in the first power supply.

With reference to the general senses detailed above, the first and second RF power supplies may form at least part of a power supply system. Then, the power supply system may comprise: a core RF generator, configured to provide an RF waveform of a specific frequency; a first coil configuration (or transformer), configured to receive the RF waveform and supply the RF voltages for generating the first RF field; and a second coil configuration (or transformer), configured to receive an RF signal derived from the RF waveform and supply the RF voltages for generating the second RF field. The core RF generator and first coil configuration may define the first RF power supply and the core RF generator and second coil configuration may define the second RF power supply.

Optionally, the power supply system further comprises a phase adjuster, configured to receive a signal that is the RF waveform or a waveform generated from the RF waveform and provide the RF signal derived from the RF waveform to the second coil configuration (or alternatively, to the first coil configuration), based on the received signal, by setting a phase of the RF signal to a desired level.

In some implementations, the power supply system further comprises a sampler, configured to sample one of the RF voltages for generating the first RF field from the first coil configuration (or alternatively, one of the RF voltages for generating the second RF field from the second coil configuration) and to provide the waveform generated from the RF waveform to the phase adjuster based on the sampled RF voltage.

Performance results and additional details of specific implementations will be further described, before returning to the general senses now discussed.

Figure 9:
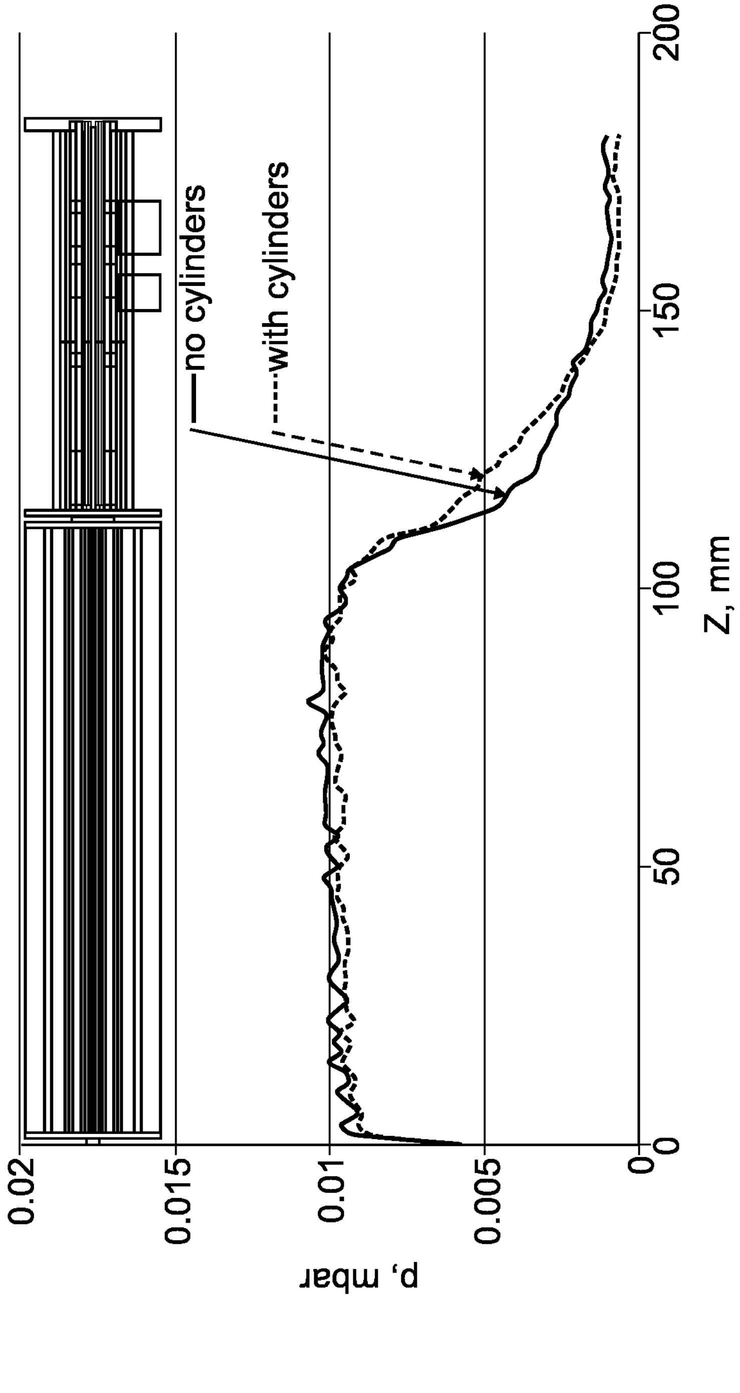
FIG. 9 plots simulated pressure against distance along the longitudinal axis of the conjoined ion trap, according to the embodiment of FIGS. 5 and 6.

Simulation results are now presented to illustrate effects of the described embodiments. Referring now to FIG. 9, there is plotted simulated pressure against distance along the longitudinal axis (Z) of the conjoined ion trap, according to the embodiment of FIGS. 5 and 6. This plot shows the results of gas dynamics simulations carried out in an ion optics modelling software package (MASIM 3D) upon a model of the conjoined extraction trap, either incorporating conductance restricting cylinders between the extraction region electrodes or not. Trajectories of 10,000 gas particles were calculated and pressure gradient across the length of the trap inferred.

A near 10 times drop in pressure is observed from the high pressure region to the point of extraction, regardless of the additional conductance restrictors. These cylinders are however useful for maintaining a higher pressure in the interface, allowing slightly better cooling of ions as they are transported to the extraction point.

Figure 10:
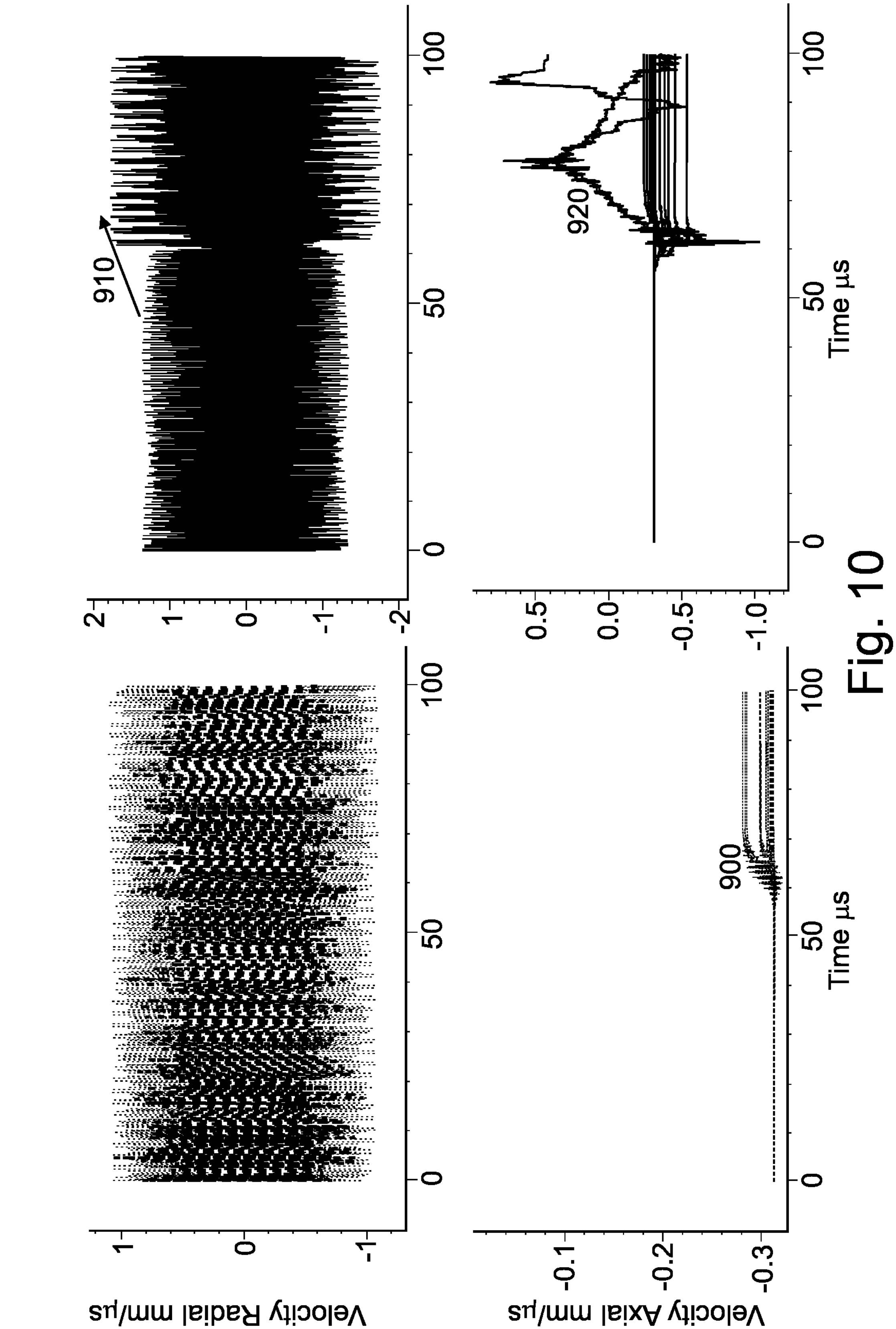
FIG. 10 shows trace plots of velocity against time from simulation for an ensemble of ions passed across the interface between two quadrupoles in accordance with the embodiment of FIGS. 5 and 6.

FIG. 10 shows trace plots of velocity against time from simulation for an ensemble of ions passed across the interface between two quadrupoles in accordance with the embodiment of FIGS. 5 and 6. The two top plots show radial velocity and the two bottom plots show axial velocity. The simulation uses 4 MHz 400V RF with the left-hand side plots using locked frequency and 5% phase and amplitude error and the right-hand side using a 10% frequency error (3.8 MHz to 4.2 MHz).

It is apparent that ion motion is not substantially impeded by the small phase or amplitude differences that might easily be present in a real power supply, as shown by the small change in axial energy at 900. However, frequency error creates considerable radial heating of the ions 910 and presents such a strong axial barrier (large axial energy changes) 920 that some ions are reflected.

Further results were obtained by constructing an extraction trap representative of the device disclosed in FIGS. 5 and 6, conjoined to a time-of-flight analyser and supplied ions via an electrospray ion source. Experimental results from this are now described.

Figure 11:
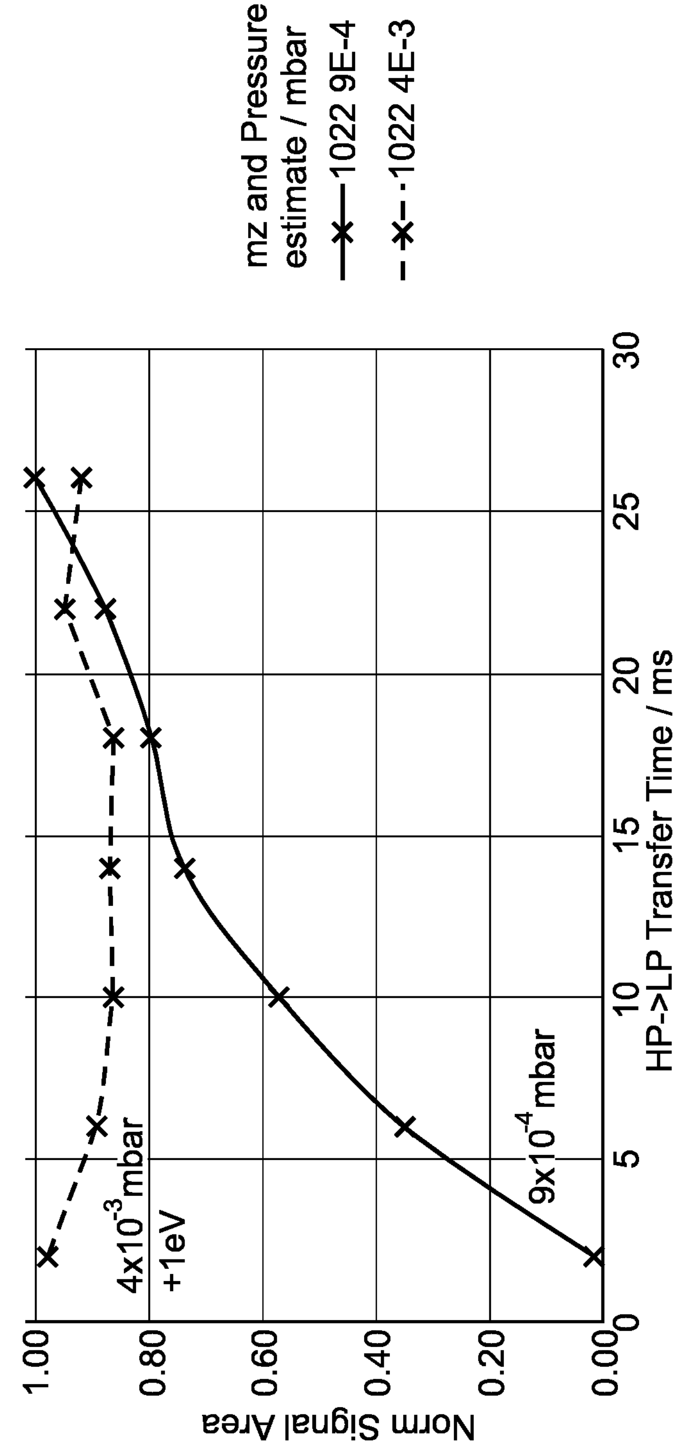
FIG. 11 plots normalised signal area against high pressure to low pressure transfer time for ions of 1022 m/z at two different pressures.
Figure 12:
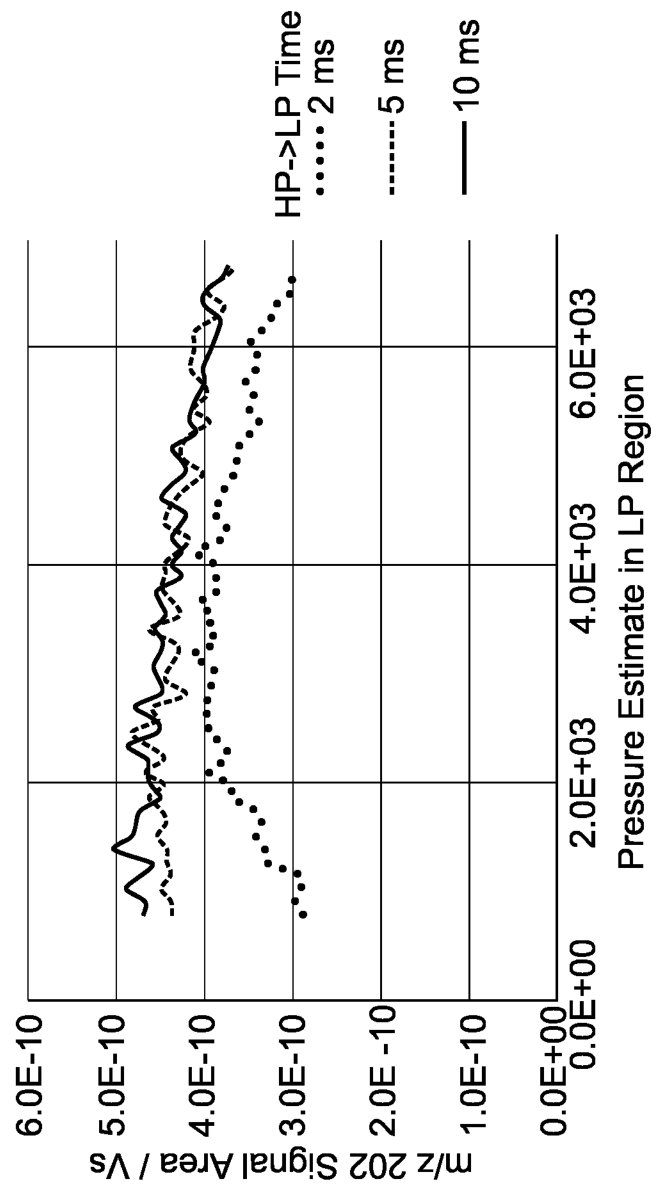
FIG. 12 shows signal area against a pressure estimate in the low pressure region for ions of 202 m/z with three different high pressure to low pressure transfer times.

Referring now to FIG. 11, there is plotted normalised signal area against high pressure to low pressure transfer time for ions of 1022 m/z at two different pressures (approximately $4\times10^{-3}$ mbar or 0.4 Pa and $9\times10^{-4}$ mbar or 0.09 Pa). Reference is also made to FIG. 12, showing signal area against a pressure estimate in the low pressure region for ions of 202 m/z with three different high pressure to low pressure transfer times. The high pressure to low pressure transfer time includes the time for transfer and cooling of the ions as they cross from high pressure to low pressure regions before the 4 KV lift and extraction shown and discussed with reference to FIG. 4. Poorly cooled ions are lost from the extraction region during the 4 KV lift and are not detected.

At a conventional extraction region pressure of approximately $4\times10^{-3}$ mbar (0.4 Pa), ions of m/z 1022 are completely retained at almost any transfer time, even down to the minimum 2 ms. Moving to a low pressure of less than $1\times10^{-3}$ mbar (0.1 Pa), however, means that considerable cooling time is required to maximise the signal. This effect is also present to a much lesser extent for ions of m/z 202, which suffer some trapping losses at 2 ms cooling time when pressure is lower than $2\times10^{-3}$ mbar (0.2 Pa), though no losses were observed at 5 ms or 10 ms transfer time.

This may represent a limitation of this design, where for very fast operation (around 5 ms total cycle), it will normally be desirable to have $1\times10^{-3}$ mbar (0.1 Pa) to $2\times10^{-3}$ mbar (0.2 Pa) pressure to cool even ions injected with less than 1 eV energy rapidly. Lower pressures and longer wait times appear to be desired in the event of large multiply charged ions, where the danger of unwanted collisions during extraction or within the analyser may mandate a minimum gas pressure. It should be noted that some experimental factors such as around 0.5V ripple in the DC offset of the extraction region may have added energy to the ions and increased cooling times somewhat.

Figure 13:
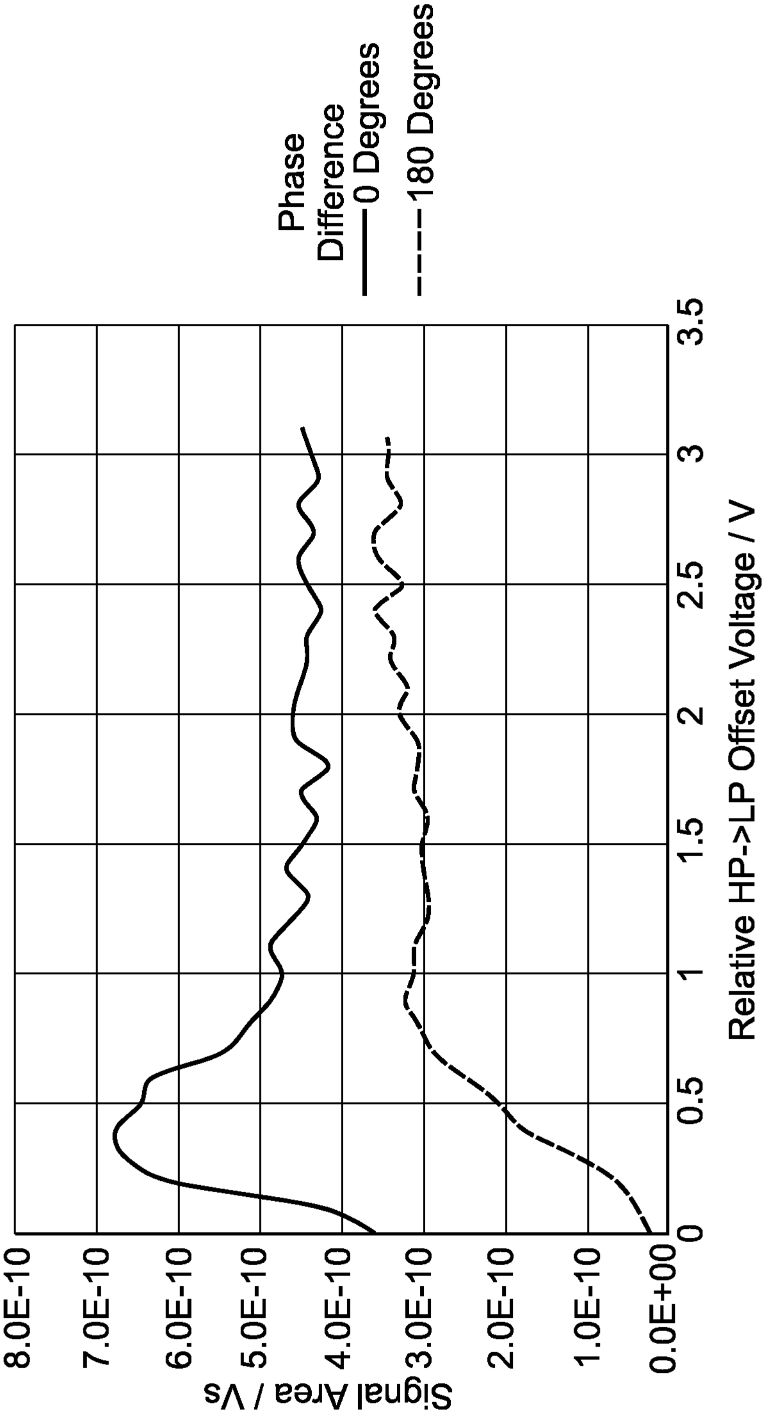
FIG. 13 plots signal area against relative voltage offset between high pressure and low region regions when the RF applied to the two regions is either in-phase or 180-degrees out-of-phase.

Referring now to FIG. 13, there is plotted signal area against relative voltage offset between high pressure and low region regions when the RF applied to the two regions is either in-phase or 180-degrees out-of-phase. This therefore shows scans of injection energy, defined by a shift in the offset of the high-pressure and low-pressure regions and its effect on the detected signal of ions of m/z 524. It is observed that with out-of-phase RF, the ions require considerably greater injection energy to overcome the interface RF barrier and that there always appear to be signal losses relative to the in-phase RF experiment.

The in-phase RF scan also shows a "sweet spot" of high signal at low injection energy, which may be due to optimal cooling or because at excess energy some ions were thought to be able to penetrate the relatively weak trapping RF used (700V) and strike the auxiliary DC pins or end of the trap. This may demonstrate the practical benefit not only of frequency locking the two RF supplies, but also maintaining a good phase alignment.

Figure 14:
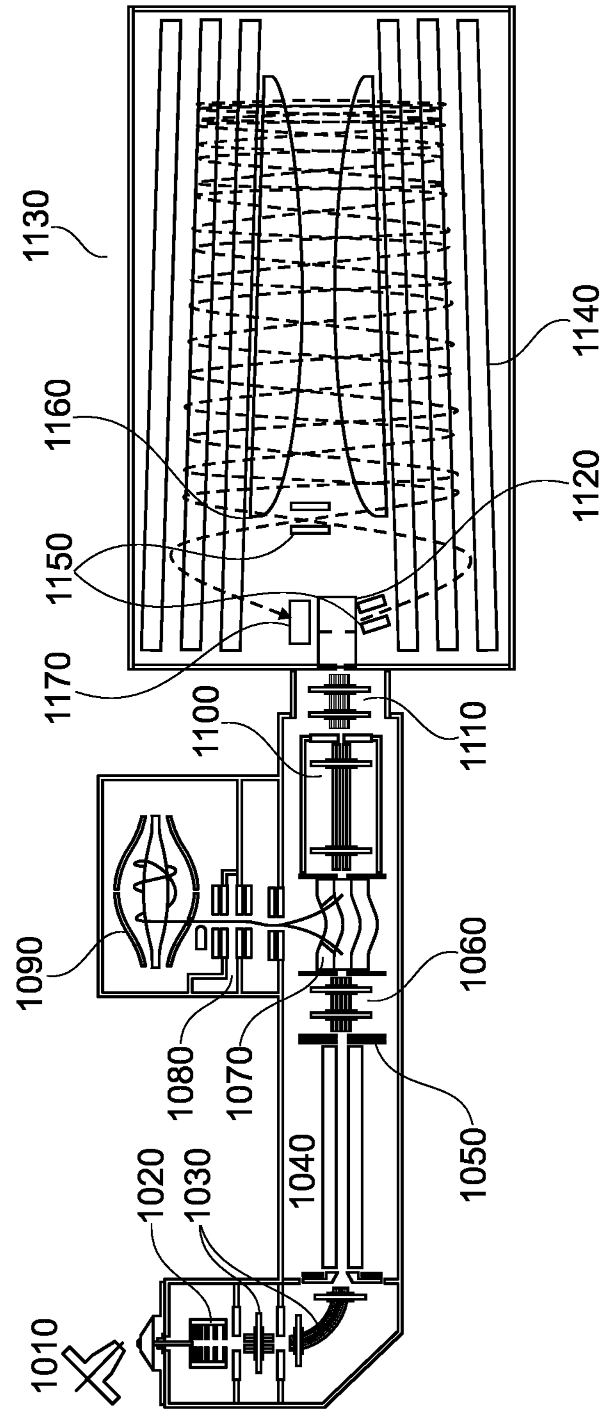
FIG. 14 shows a schematic diagram of a mass spectrometer incorporating the disclosed extraction trap.

Next referring to FIG. 14, there is shown a schematic diagram of a mass spectrometer incorporating the disclosed extraction trap. This comprises: an electrospray ionisation (ESI) ion source 1010; a RF lens 1020; ion guides 1030; a mass filter 1040; an ion gate 1050; further ion guide 1060; curved ion trap (C-trap) 1070; a Z-lens 1080; an orbital trapping mass analyser 1090; a collision cell 1100; a downstream ion trap 1110; an extraction trap 1120; tilted ion mirrors 1140; deflectors 1150; correcting stripe electrode 1160; and a detector 1170.

This is a hybrid instrument combining a quadrupole mass filter 1040, an orbital trapping mass analyser 1090 and a multi-reflection time-of-flight (MR-ToF) mass analyser 1130. The extraction trap device 1120 is used in this example to feed the MR-ToF analyser 1130. Such general instrument layout has been previously described in U.S. Pat. No. 10,699,888B2 and U.S. Pat. No. 10,593,525B2, for example. U.S. Pat. No. 10,699,888B2 describes a general data-independent acquisition method, whereby the complete ion beam from the source 1010 is occasionally sampled by the C-Trap 1070 (a form of extraction trap) and measured by the or orbital trapping mass analyser 1090, but mostly the beam is filtered in a mass sequential manner, fragmented in the collision cell 1100 and the fragments analysed in the MR-ToF analyser 1130. The MR-ToF analyser 1130 is described in detail in WO2013110587A2, although more conventional time-of-flight analysers could be substituted.

A considerable problem may occur when operating such an instrument at high repetition rates. The time taken for ions to travel through a short region of approximately $10^{-2}$ mbar (1 Pa) pressure is on the order of about 1 ms, in addition to time required to thermalise ions. The time to switch a resolving quadrupole (mass filter 1040) and transmit a new packet of isolated ions is also around this level. For an instrument operating with a 200 Hz repetition rate, the time to switch the quadrupole, send ions through to the high pressure region of the extraction trap 1120, cool and transfer to the extraction region of the trap and then cool and extract into the MR ToF 1130, may easily exceed the 5 ms allowed by the repetition rate.

Parallelising stages by pre-trapping ions in the high pressure region of the extraction trap 1120, whilst the low pressure region completes its sequence (ion cooling, 4 KV lift, extraction to ToF) as described in US20190103263A1 buys some time. However, the rate determining step of ion transfer from the high pressure to the low pressure region of the extraction trap 1120 may still limit the repetition rate. Worse, this may leave no time for the quadrupole itself to transmit ions, so that very little of the beam may be sampled (low duty cycle) unless there is a pre-accumulation step before the mass filter 1040. This is deeply undesirable, as space charge effects rapidly become overwhelming.

Figure 15:
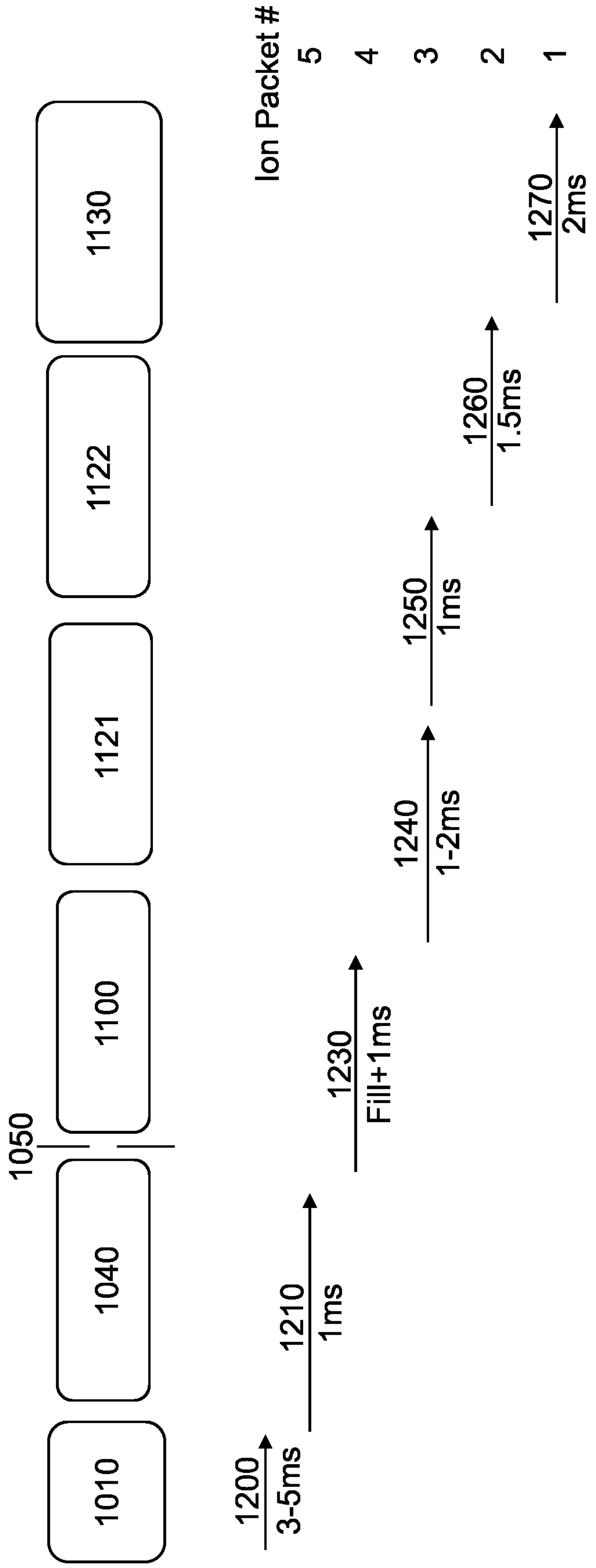
FIG. 15, schematically depicts an improved processing sequence for the mass spectrometer of FIG. 14.

Careful use of the extraction trap according to the present disclosure may substantially improve the performance. Referring now to FIG. 15, there is schematically depicted an improved processing sequence for the mass spectrometer of FIG. 14. Where the features of FIG. 14 are illustrated, the same reference numerals have been used. Each operation is indicated by an arrow, ordered chronologically left to right and where the vertical level of the arrow indicates which ion packet is occupying it at a slice in time.

The process comprises simultaneous: Data Dependent Acquisition (DDA) source switch 1200; Fast Quadrupole Switching 1210 of ion packet 5; fill time and trapping 1230 in the collision cell 1100 of ion packet 4; transfer 1240 of ion packet 3 from the collision cell 1100 to the high pressure region 1121 of the extraction trap 1120 and transfer 1250 of ion packet 3 from the high pressure region 1121 of the extraction trap 1120 to the low pressure region 1122 of the extraction trap 1120; extraction process 1260 of ion packet 2 via a 4 kV Lift and extraction; and ToF analysis 1270 of ion packet 1. The maximum injection time for a repetition rate of 200 Hz is 4 ms.

This approach makes use of an extra trapping stage adjacent to the quadrupole mass filter 1040, in this case the collision cell 1100. Then, ions from the quadrupole 1040 may be accumulated in parallel to the transfer stages and the slow transfer from the quadrupole 1040 to the extraction trap low pressure region 1122 is broken up into two much faster parallel steps 1230, 1240, 1250.

As discussed above with reference to FIG. 4, at collision cell transfer stage 1240, $RF_2$ (applied to the multipole in the high pressure region 400) should have an amplitude set to accept the incoming ion packet. In contrast at low pressure transfer stage 1250, $RF_1$ (applied to the multipole in the low pressure region 300) and $RF_2$ should have an approximately equal amplitude (although $RF_2$ may be slightly higher than $RF_1$) to facilitate barrier-free ion transfer from the high pressure region to the low pressure region.

In FIG. 15, a highly parallelised sequence of stages is utilised, including simultaneous consideration of five different ion packets and simultaneous trapping in three pressurised regions. In this way, the quadrupole collision cell fill stage 1230 is completely parallelised and has only a minimum time of about 1 ms, leaving 4 ms available for ion filling in a 5 ms 200 Hz sequence; an 80% duty cycle. The remaining 20% is more amenable to being restored by pre-trapping before the mass filter 1040, as such a small amount is not necessarily so space charge restrictive, though care should be taken. It should also be noted that the other stages are all set to around to 2 ms, giving some overhead for more difficult ions or higher still repetition rates. In principle, the parallelisation of the extraction process 1260 (4 KV lift) and ToF analysis 1270 is not necessary at a 200 Hz repetition rate, but is trivial to achieve compared to the other stages and allows extension of total ion cooling time in the extraction region.

It should be emphasised that at a low pressure for the low pressure region 1122 of $0.25\times10^{-3}$ mbar (0.025 Pa) to $2\times10^{-3}$ mbar (0.2 Pa) the transfer stage 1250 can only be set to such a short time period if ions are transferred rapidly and at low energy. The ability to achieve this is a key advantage of the disclosed device. Desirable injection energies should still be at least or greater than 0.05 eV even in the best case, to allow sufficient ion velocity to cover distance and to overcome even well controlled residual barriers caused by power supply noise and misalignments. An energy of at least 0.1 eV and even 0.5 eV is practical as an ion injection energy; higher energies to 2 eV or more may work, but may sacrifice the advantages of the device.

Included in the sequence is a relatively long (3 ms to 5 ms) stage for the source optics to switch 1200. This is not a factor during data independent acquisition (DIA), provided the transmission m/z range is broader than the shifts between m/z. In data dependent acquisition (DDA) though, where the quadrupole may make very large m/z jumps between target peaks, this delay may become limiting. The timing allowed for each stage may be fixed or dynamically modified by the controller, based on knowledge of transmission time of the injected ion m/z or the target range of any fragments. It should be noted that there may often be some non-parallelisable overlap between parallel stages, for example emptying the collision cell 1100 should take around 100 μs, and it will be appreciated that power supplies all have their own switching times, which may introduce some further delay.

It is also noted that, in FIG. 15, the parallel processing is only applied along the chain to the MR ToF mass analyser 1130 (ToF mode). The C-Trap 1070 and ion guides 1060, 1110 are omitted in this drawing, as ions merely pass through them, and too quickly to be relevant to the timing scheme. The C-Trap 1070 may be disabled as a trap when the instrument operates in ToF mode and instead becomes a very short ion guide. Operation of the orbital trapping mass analyser 1090 is also not shown in this drawing, but breaks the chain and involves just filling the C-Trap 1070 or collision cell 1100, which then returns ions to C-Trap 1070.

Referencing once more the general senses of the disclosure, the mass spectrometer may be implemented with further devices. For example, at least one further ion optical device may be provided upstream the second (multipole) ion optical device. The at least one further ion optical device may be configured for one or more of ion trapping, ion selection (for instance, a mass filter) and ion processing (for example, a collision cell). The mass spectrometer further comprises a mass analyser downstream the first (multipole) ion optical device. A further ion extraction trap may be provided upstream the second (multipole) ion optical device. Then, the further ion extraction trap may be configured to direct ions selectively towards the second (multipole) ion optical device or towards an upstream mass analyser (to provide a hybrid mass spectrometer, tandem mass spectrometer or $MS^n$ configuration, for example).

In implementations, at least one further ion optical device is provided upstream the second (multipole) ion optical device. Then, the mass spectrometer may further comprise a controller, configured simultaneously to cause: a first ion sample to be stored (accumulated) and/or processed in the upstream at least one further ion optical device; a second ion sample to be stored in the second (multipole) ion optical device; and a third ion sample to be stored in or ejected from the first (multipole) ion optical device. Optionally, the at least one upstream ion optical device may comprise two ion optical devices. Then, the controller may be configured simultaneously to cause: a first ion sample to be stored or processed in a first of the two upstream ion optical devices; a second ion sample to be stored or processed in a second of the two upstream ion optical devices; a third ion sample to be stored in the second (multipole) ion optical device; and a fourth ion sample to be stored in or ejected from the first (multipole) ion optical device. The at least one upstream ion optical device may comprise a mass filter and/or a collision cell.

The mass spectrometer may further comprise a mass analyser downstream of the second (multipole) ion optical device. Then, the controller may be further configured to cause, at the same time as ions are stored and/or processed in the upstream at least one further ion optical device, the first (multipole) ion optical device and the second (multipole) ion optical device, a further ion sample to be analysed in the mass analyser.

According to another aspect of the disclosure (which may be combined with any other features of aspects disclosed herein), there may be considered a method of operating a mass spectrometer. The method comprises: extracting, during a first time period, a first ion sample from a first ion optical device in a relatively low gas pressure region to a downstream ion processing device; processing, during the first time period, a second ion sample in a second ion optical device in a relatively high gas pressure region, upstream and separated from the first ion optical device by a gas conductance region; and processing, during the first time period, a third ion sample in a third ion optical device upstream the second ion optical device. Then, during a second time period that is immediately subsequent the first time period, the method may further comprise transferring the second ion sample from the second ion optical device to the first ion optical device and transferring the third ion sample from the third ion optical device to the second ion optical device. Typically, one, some or all of the first, second and third ion optical devices are multipole ion optical devices. This method may also be implemented as a mass spectrometer with an accordingly configured controller. The mass spectrometer may be in accordance with a mass spectrometer as herein disclosed or there may be differences (for instance, one or more of the ion optical devices may not be multipole ion optical devices, and may be, for example, a stacked ring ion guide, ion tunnel device, or an ion optical device comprising an ion carpet).

In this approach, at least three ion samples (or packets) are processed in parallel. Processing may comprise one or more of receiving, confining and transferring ions, for example (although it may also include cooling, mass selecting or analysing ions). Advantageously, this parallel processing of the ions may be especially advantageous for fast instrument operation. In particular, each of the first time period and second time period may have a duration of no more than (and preferably less than) 5 ms and potentially 4 ms or 3 ms.

Preferably, the downstream ion processing device is a mass analyser, which may be a time-of-flight mass analyser or an orbital trapping mass analyser in certain implementations. For example, during the first time period, a fifth ion sample may be analysed in the downstream ion processing device.

During the first time period, the third ion sample may be processed by collisional cooling or mass selection. Optionally, a fourth ion sample may also be processed in a fourth ion optical device, upstream the third ion optical device and the processing may comprise collisional cooling or mass selection. Additionally or alternatively, during the second time period, a fourth ion sample may be transferred to the third ion optical device from upstream (for example, from the fourth ion optical device or an upstream ion source).

In implementations, the first and second (and optionally, the third) ion optical devices are aligned along a common axis. Then, the step of extracting may comprise transferring the first ion sample to the downstream ion processing device orthogonally to the common axis.

Although embodiments according to the disclosure have been described with reference to particular types of devices and applications (particularly mass spectrometers) and the embodiments have particular advantages in such case, as discussed herein, approaches according to the disclosure may be applied to other types of device and/or application. The specific structure, arrangement, manufacturing details and operational details (for example, potentials) of the mass spectrometer and/or ion extraction device and associated uses, whilst potentially advantageous (especially in view of known manufacturing constraints and capabilities), may be varied significantly to arrive at devices or mode of operation with similar or identical operation. Each feature disclosed in this specification, unless stated otherwise, may be replaced by alternative features serving the same, equivalent or similar purpose. Thus, unless stated otherwise, each feature disclosed is one example only of a generic series of equivalent or similar features.

As alternatives to wedge shaped or tapered auxiliary DC electrodes, it may be possible to position the auxiliary DC electrodes angled to the axis defined by the RF trapping electrodes along their length. Additionally or alternatively, the auxiliary DC electrodes in the low pressure region, which tend to form a potential well at the extraction point to confine ions, may be provided in other forms, for example: a confining “pin” form, such as shown in FIG. 2 of U.S. Pat. No. 10,734,210; or a confining first or second DC electrodes form, such as described in UK Patent Application No. 2104522.4.

Although particular embodiments have been described above in terms of the first and second multipole ion optical devices each comprising a quadrupole, it would also be possible for one or both of the multipole ion optical devices to comprise any other type of multipole ion guide, such as for example a hexapole, octupole, decapole, and so on.

Moreover, although embodiments have been described above with reference to first and second multipole ion optical devices, one or both multipole ion optical device could be substituted with any equivalent ion optical device using RF fields for confinement, including for example, a stacked ring ion guide, an ion tunnel device, or an ion optical device comprising an ion carpet.

A stacked ring ion guide (or ion tunnel) device comprises a plurality of apertured (for example, ring) electrodes aligned along a central axis. Opposite phases of an RF voltage may be applied to adjacent apertured electrodes to create an ion trapping region within the device. Optionally, an axial DC electric field may be formed within the ion trapping region to urge ions in a direction parallel to the central axis.

An ion carpet (sometimes termed an RF carpet) is a known configuration of electrodes, which may provide an ion repelling surface, such that in combination with another electrode or electrode arrangement, particularly providing another ion repelling surface (which may be another ion carpet, for example), an ion optical device may be provided. For the sake of completeness, such configurations are further explained below.

The ion carpet of an ion optical device comprising an ion carpet may comprise a one-dimensional or two-dimensional array of electrodes. Opposite phases of an RF voltage may be applied to adjacent electrodes to create an ion repelling surface. By arranging a second ion repelling surface parallel to the ion carpet, an ion trapping region may be created between the ion carpet and the second ion repelling surface. The second ion repelling surface may be formed from a DC repeller electrode arranged parallel to the ion carpet. Alternatively, the second ion repelling surface may be formed from a second ion carpet arranged parallel to the first ion carpet. One or more additional DC and/or RF electrodes may be provided to provide additional ion trapping in other directions.

Figure 16B:
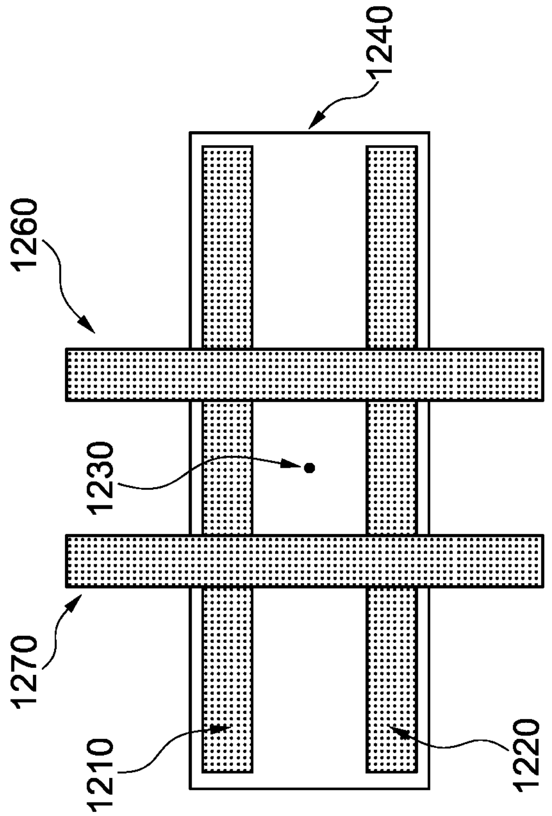
FIG. 16B schematically illustrates a front view of the example of FIG. 16A.
Figure 16A:
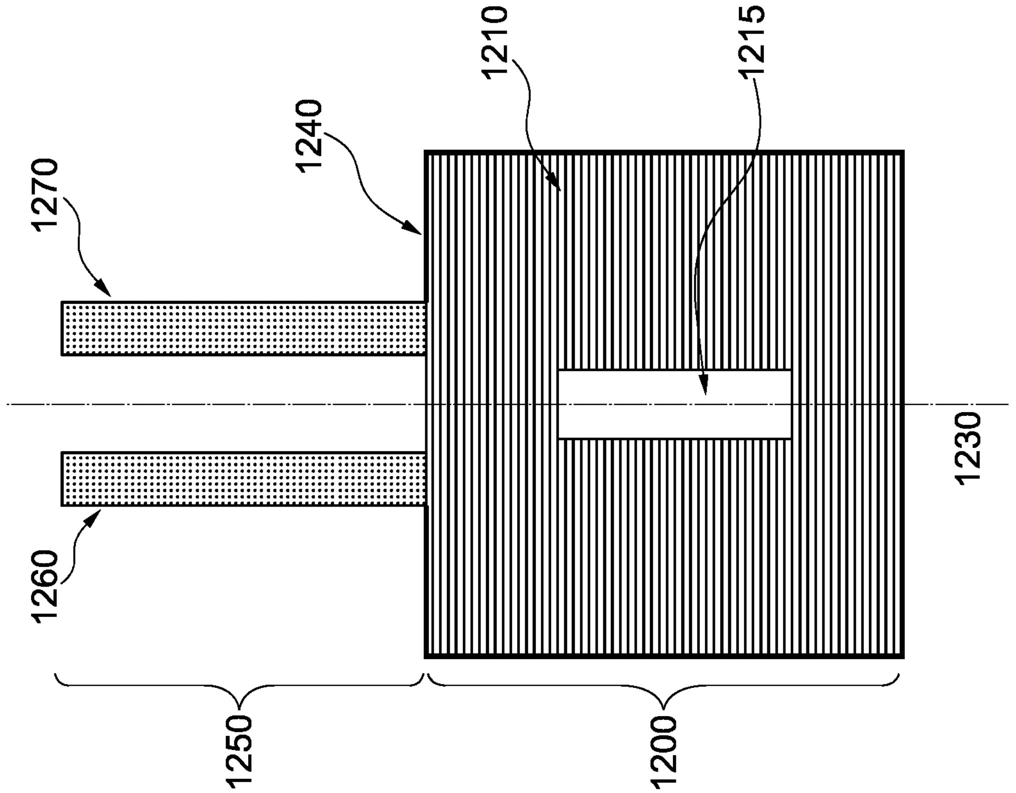
FIG. 16A schematically depicts a top view of an example configuration of two ion optical devices, each comprising a respective ion carpet, according to the disclosure.

Referring now to FIG. 16A, there is schematically depicted a top view of an example configuration of two ion optical devices, each comprising a respective ion carpet, according to the disclosure. Reference is also made to FIG. 16B, schematically illustrating a front view of the example of FIG. 16A. There is shown: a first ion optical device 1200 at a relatively low pressure; and a second ion optical device 1250 at a relatively high pressure. The first ion optical device 1200 is enclosed by a housing 1240, which acts as a gas conductance restriction, restricting gas but providing an aperture to allow ions to pass from the second ion optical device 1250 to the first ion optical device 1200. An ion axis 1230 shows the general direction of ion travel through the second ion optical device 1250 and into the first ion optical device 1200.

The first ion optical device (or ion guide) 1200 comprises a first (top) ion carpet 1210 and a second (bottom) ion carpet 1220. The first ion carpet 1210 is advantageously formed of a plurality of electrodes arranged in a plane, with the plane being parallel to ion axis 1230. The second ion carpet 1220 is parallel to the first ion carpet 1210 to form a trapping region between the first ion carpet 1210 and the second ion carpet 1220, with the ion axis 1230 passing through the trapping region. An aperture 1215 is provided in the first ion carpet 1210, to allow orthogonal ejection of ions from the first ion optical device 1200.

The second ion optical device (or ion guide) 1250 comprises: a third ion carpet 1260 and a fourth ion carpet 1270. Each of the third ion carpet 1260 and the fourth ion carpet 1270 comprise an electrode arrangement that extends into the plane that is perpendicular to the plane of the top view in FIG. 16A and perpendicular to the plane of the front view in FIG. 16B. Thus, the parallel planes of the third ion carpet 1260 and the fourth ion carpet 1270 are perpendicular to the parallel planes of the first ion carpet 1210 and the second ion carpet 1220.

Essentially, both the first ion optical device 1200 and the second ion optical device 1250 guides may be seen as classical planar ion tunnels with alternating RF phases (and DC distribution for the axial field, not shown), but the electrodes are perpendicular to ion motion rather than stretched along it. The electrodes for these two devices do not need to be particularly small. It may be sufficient that the spatial period of the electrodes is two or more times smaller than the distance between the electrodes and the ions (for example, based on ion axis 1230). Constraint of ions on the ion axis 1230 could be also facilitated by additional transversal DC voltages (not shown).

For extraction from the first ion optical device 1200, the RF may be switched off and DC applied across to shoot ions through the electrode system, similar to the implementation shown in FIGS. 2 to 4, for instance.

By locating planar electrode assemblies perpendicular to each other, conductivity is limited to the intersection between them. In this way, the housing 1240 can act as a gas conductance restriction similarly to the implementations previously described.

In such implementations, the exact configuration of each ion carpet may be varied. Also, certain ion carpets may be replaced by a (planar) deflector electrode, for example supplied with a DC potential. For instance, the first ion carpet 1210 and/or the third ion carpet 1260 could be replaced with such an electrode. The deflector electrode may have approximately the same size and shape as the electrode arrangement forming the respective ion carpet in FIGS. 16A and 16B.

Thus, returning to the general sense of the disclosure discussed above, it may be understood that, in particular embodiments, the first (lower pressure) ion optical device may and/or the second (higher pressure) ion optical device may be any one of: (i) a multipole ion optical device (such as a quadrupole, hexapole, octupole, decapole, and so on), (ii) a stacked ring ion guide (or ion tunnel) device, and (iii) an ion optical device comprising an ion carpet. The two ion optical devices may be of the same type, or they may be of different types. Where the two ion optical devices are of the same type, they may have different (for instance, perpendicular or orthogonal) orientations, which may include perpendicular in one dimension. As an example, the first ion optical device may comprise a first ion carpet, oriented in a first plane and the second ion optical device may comprise a second ion carpet, oriented in a second plane that is orthogonal (or perpendicular) to the first plane. The first ion optical device may also comprise an electrode arrangement (which may comprise a DC electrode or a further ion carpet), typically parallel to the first ion carpet. The ion trapping region of the first ion optical device may be defined thereby. The second ion optical device may also comprise an electrode arrangement (which may comprise a DC electrode or a further ion carpet), typically parallel to the second ion carpet. The ion trapping region of the second ion optical device may be defined thereby, such that an ion axis may be defined by an overlap between the respective trapping regions of the first and second ion optical devices. The gas conductance restriction may include a housing around at least part of the second ion optical device, advantageously allowing ion transport between trapping regions of the first and second ion optical devices.

Beneficially, and as described above, the first ion optical device is configured to eject ions into a mass analyser (that is, the first ion optical device is configured as an extraction trap), while the second ion optical device is configured to accumulate and cool ions, before passing the accumulated and cooled ions to the first ion optical device for ejection into the mass analyser.

This aspect can be (and in implementations is) combined with any one or more of the optional features described herein, including any one or more or each of the optional features described above in relation to the embodiments including first and second multipole ion optical devices.

As used herein, including in the claims, unless the context indicates otherwise, singular forms of the terms herein are to be construed as including the plural form and vice versa. For instance, unless the context indicates otherwise, a singular reference herein including in the claims, such as "a" or "an" (such as an ion multipole device) means "one or more" (for instance, one or more ion multipole device). Throughout the description and claims of this disclosure, the words "comprise", "including", "having" and "contain" and variations of the words, for example "comprising" and "comprises" or similar, mean "including but not limited to", and are not intended to (and do not) exclude other components.

The use of any and all examples, or exemplary language ("for instance", "such as", "for example" and like language) provided herein, is intended merely to better illustrate the invention and does not indicate a limitation on the scope of the invention unless otherwise claimed. No language in the specification should be construed as indicating any non-claimed element as essential to the practice of the invention.

Any steps described in this specification may be performed in any order or simultaneously unless stated or the context requires otherwise.

All of the aspects and/or features disclosed in this specification may be combined in any combination, except combinations where at least some of such features and/or steps are mutually exclusive. As described herein, there may be particular combinations of aspects that are of further benefit, such the aspects of ion guides for use in mass spectrometers and/or ion mobility spectrometers. In particular, the preferred features of the invention are applicable to all aspects of the invention and may be used in any combination. Likewise, features described in non-essential combinations may be used separately (not in combination).

The invention claimed is:

1. A mass spectrometer, comprising:

a first ion optical device in a relatively low gas pressure region, configured to receive RF voltages from a first RF power supply for generating a first RF field that confines ions in a trapping region of the first ion optical device;

a second ion optical device in a relatively high gas pressure region, configured to receive RF voltages from a second RF power supply for generating a second RF field that confines ions in a trapping region of the second ion optical device; and a gas conductance restriction, configured to restrict gas flow from the relatively high gas pressure region to the relatively low gas pressure region, the gas conductance restriction having an aperture to allow ions to pass from the second ion optical device to the first ion optical device; and wherein the first and second RF power supplies are independent to allow the RF voltages for generating the first RF field to have a different amplitude from the RF voltages for generating the second RF field, wherein the first ion optical device is a first multipole ion optical device and wherein the second ion optical device is a second multipole ion optical device, and wherein at least one multipole electrode of one or both of the first multipole ion optical device and the second multipole ion optical device has a lip that extends towards the electrodes of the other ion optical device.

2. The mass spectrometer of claim 1, wherein the first and second RF power supplies are configured to provide the RF voltages for generating the first RF field and the RF voltages for generating the second RF field with identical frequency and aligned phase.

3. The mass spectrometer of claim 1, wherein the first and second RF power supplies are configured to supply the RF voltages so as to generate the second RF field to trap ions in the second ion optical device and at the same time, to configure the RF voltages for generating the first RF field so as to eject ions from the first ion optical device.

4. The mass spectrometer of claim 1, wherein:

the first multipole ion optical device comprises: a first pair of opposing electrodes, having applied the same RF voltages of an RF magnitude and a first phase and opposing polarity DC voltages of a DC voltage level; and a second pair of opposing electrode arrangements, each of the opposing electrode arrangements comprising: a split RF electrode comprising two separated electrode parts that have applied the same RF voltages of the RF magnitude and a second phase that is opposite the first phase and opposing polarity DC voltages of the DC voltage level; and an auxiliary DC electrode between the two separated electrode parts of the split RF electrode; and/or the second multipole ion optical device comprises: a first pair of opposing electrodes, having applied the same RF voltages of an RF magnitude and a first phase; and a second pair of opposing electrodes, having applied RF voltages of the RF magnitude and a second phase that is opposite the first phase; and auxiliary DC electrodes between each of the first pair of opposing electrodes and respective ones of the second pair of opposing electrodes.

5. The mass spectrometer of claim 4, wherein the first multipole ion optical device further comprises a bridge between the first pair of opposing electrodes of the first multipole ion optical device, such that the first RF field provides both radial and axial confinement.

6. The mass spectrometer of claim 1, wherein the first and/or second multipole ion optical device comprises insulating rods between multipole electrodes of the ion optical device, the insulating rods extending from an entrance of the ion optical device to approximately half the length of the ion optical device.

7. The mass spectrometer of claim 1, wherein the gas conductance restriction comprises a diaphragm and/or the aperture of the gas conductance restriction is larger than an inscribed radius, $r_0$, of the first ion optical device and/or the second ion optical device.

8. The mass spectrometer of claim 1, wherein there is no ion optical device between the first and second ion optical devices that has a smaller radius than the radii of the first and second ion optical devices.

9. The mass spectrometer of claim 1, wherein the mass spectrometer is configured so that one or both of:

buffer gas is fed into the relatively high pressure region through a capillary to reach a desired pressure; and a pumping speed of the relatively low pressure region is selected to achieve the desired pressure in the relatively high pressure region.

10. The mass spectrometer of claim 1, wherein the first ion optical device and/or the second ion optical device comprise auxiliary DC electrodes arranged to receive a DC potential so as to create an axial DC gradient superimposed on the respective RF field.

11. The mass spectrometer of claim 1, wherein one or more of:

at least one further ion optical device, preferably configured for one or more of ion trapping, ion selection and ion processing, is provided upstream the second multipole ion optical device;

the first ion optical device is configured to receive ions from the second ion optical device along a common axis of the first and second ion optical devices and to allow extraction of the received ions in a direction orthogonal to the axis;

the mass spectrometer further comprises a mass analyser downstream the first ion optical device.

12. The mass spectrometer of claim 1, wherein at least one further ion optical device is provided upstream the second ion optical device, the mass spectrometer further comprising a controller, configured simultaneously to cause: a first ion sample to be stored and/or processed in the upstream at least one further ion optical device; a second ion sample to be stored in the second ion optical device; and a third ion sample to be stored in or ejected from the first ion optical device.

13. The mass spectrometer of claim 12, wherein the at least one upstream ion optical device comprises two ion optical devices and the controller is configured simultaneously to cause: a first ion sample to be stored or processed in a first of the two upstream ion optical devices; a second ion sample to be stored or processed in a second of the two upstream ion optical devices; a third ion sample to be stored in the second ion optical device; and a fourth ion sample to be stored or ejected from in the first ion optical device.

14. The mass spectrometer of claim 12, wherein the at least one further ion optical device comprises a mass filter and/or a collision cell.

15. The mass spectrometer of claim 12, wherein the mass spectrometer further comprises a mass analyser downstream the first ion optical device and the controller is further configured to cause, at the same time as ions are stored and/or processed in the upstream at least one further ion optical device, the first ion optical device and the second ion optical device, a further ion sample to be analysed in the mass analyser.

16. A mass spectrometer, comprising:

a first ion optical device in a relatively low gas pressure region, configured to receive RF voltages from a first RF power supply for generating a first RF field that confines ions in a trapping region of the first ion optical device;

a second ion optical device in a relatively high gas pressure region, configured to receive RF voltages from a second RF power supply for generating a second RF field that confines ions in a trapping region of the second ion optical device; and a gas conductance restriction, configured to restrict gas flow from the relatively high gas pressure region to the relatively low gas pressure region, the gas conductance restriction having an aperture to allow ions to pass from the second ion optical device to the first ion optical device; and wherein the first and second RF power supplies are independent to allow the RF voltages for generating the first RF field to have a different amplitude from the RF voltages for generating the second RF field, wherein each of the first and/or second ion optical device is one of: a multipole ion optical device; a stacked ring ion guide; an ion tunnel device; and an ion optical device comprising an ion carpet, and wherein the first ion optical device comprises a first ion carpet, oriented in a first plane and the second ion optical device comprises a second ion carpet, oriented in a second plane that is orthogonal to the first plane.

17. A mass spectrometer, comprising:

a first ion optical device in a relatively low gas pressure region, configured to receive RF voltages from a first RF power supply for generating a first RF field that confines ions in a trapping region of the first ion optical device;

a second ion optical device in a relatively high gas pressure region, configured to receive RF voltages from a second RF power supply for generating a second RF field that confines ions in a trapping region of the second ion optical device; and a gas conductance restriction, configured to restrict gas flow from the relatively high gas pressure region to the relatively low gas pressure region, the gas conductance restriction having an aperture to allow ions to pass from the second ion optical device to the first ion optical device; and wherein the first and second RF power supplies are independent to allow the RF voltages for generating the first RF field to have a different amplitude from the RF voltages for generating the second RF field, wherein the first and second RF power supplies form at least part of a power supply system, the power supply system comprising:

a core RF generator, configured to provide an RF waveform of a specific frequency;

a first coil configuration, configured to receive the RF waveform and supply the RF voltages for generating the first RF field, the core RF generator and first coil configuration defining the first RF power supply; and a second coil configuration, configured to receive an RF signal derived from the RF waveform and supply the RF voltages for generating the second RF field, the core RF generator and second coil configuration defining the second RF power supply wherein the power supply system further comprises a phase adjuster, configured to receive a signal that is the RF waveform or a waveform generated from the RF waveform and provide the RF signal derived from the RF waveform to the second coil configuration, based on the received signal, by setting a phase of the RF signal to a desired level; and wherein the power supply system further comprises: a sampler, configured to sample one of the RF voltages for generating the first RF field from the first coil configuration and to provide the waveform generated from the RF waveform to the phase adjuster based on the sampled RF voltage.

* * * * *